United States Patent
Lee

(10) Patent No.: US 12,309,786 B2
(45) Date of Patent: *May 20, 2025

(54) METHOD AND APPARATUS FOR REPORTING HARQ FEEDBACK TO BASE STATION IN NR V2X

(71) Applicant: LG ELECTRONICS INC., Seoul (KR)

(72) Inventor: Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

This patent is subject to a terminal disclaimer.

(21) Appl. No.: 17/766,709

(22) PCT Filed: Oct. 6, 2020

(86) PCT No.: PCT/KR2020/013539
§ 371 (c)(1),
(2) Date: Apr. 5, 2022

(87) PCT Pub. No.: WO2021/071192
PCT Pub. Date: Apr. 15, 2021

(65) Prior Publication Data
US 2024/0073903 A1    Feb. 29, 2024

Related U.S. Application Data

(60) Provisional application No. 62/911,360, filed on Oct. 6, 2019.

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1812* (2013.01); *H04L 1/1854* (2013.01); *H04W 72/40* (2023.01); *H04W 72/563* (2023.01)

(58) Field of Classification Search
CPC ............... H04L 1/1812; H04L 1/1854; H04L 2001/0092; H04W 72/02; H04W 72/04;
(Continued)

(56) References Cited

U.S. PATENT DOCUMENTS

2017/0150340 A1   5/2017   Park
2019/0090218 A1   3/2019   Noh et al.
(Continued)

FOREIGN PATENT DOCUMENTS

CN   109565791 A   4/2019
EP   3471477 A1    4/2019
(Continued)

OTHER PUBLICATIONS

R2-1905847: "Uplink and Sidelink transmission prioritization in NR V2X," 3GPP TSG-RAN WG2 Meeting #106, Reno, US, May 13-17, 2019, vivo, (8 Pages).

(Continued)

*Primary Examiner* — Thomas R Cairns
(74) *Attorney, Agent, or Firm* — BRYAN CAVE LEIGHTON PAISNER LLP

(57) ABSTRACT

A method for performing wireless communication by a first device, and a device for supporting same are provided. The method may comprise: receiving, from a base station, information related to a physical uplink control channel (PUCCH) resource for reporting hybrid automatic repeat request (HARQ) feedback information and information related to a first sidelink (SL) resource; generating the HARQ feedback information based on first SL transmission being not performed on the first SL resource by the first (Continued)

device; and determining a priority value of the HARQ feedback information, wherein the priority value of the HARQ feedback information is a same as a largest priority value among at least one priority value related to the first SL resource.

20 Claims, 33 Drawing Sheets

(51) Int. Cl.
*H04L 1/1829* (2023.01)
*H04W 72/40* (2023.01)
*H04W 72/563* (2023.01)

(58) Field of Classification Search
CPC ... H04W 72/115; H04W 72/12; H04W 72/21; H04W 72/40; H04W 72/563; H04W 92/18

See application file for complete search history.

(56) References Cited

U.S. PATENT DOCUMENTS

2019/0182800 A1 6/2019 Park et al.
2020/0404684 A1 12/2020 Lee et al.

FOREIGN PATENT DOCUMENTS

| EP | 3925129 A1 | 12/2021 |
| WO | 2017171528 A1 | 10/2017 |
| WO | 2021029674 A1 | 2/2021 |

OTHER PUBLICATIONS

Lenovo et al., "Discussion on resource allocation for NR sidelink Mode 1", R1-1910145, 3GPP TSG RAN WG1 Meeting #98bis, Chongqing, China, Oct. 14-20, 2019, see sections 2.2 and 2.6.
CMCC, "Discussion on mode-1 resource allocation for NR sidelink", R1-1910163, 3GPP TSG RAN WG1 Meeting #98bis, Chongqing, China, Oct. 14-20, 2019, see section 2.
Samsung, "On Resource Allocation for NR V2X Mode 1", R1-1908476, 3GPP TSG RAN WG1 Meeting #98, Prague, CZ, Aug. 26-30, 2019, see sections 4-5.
LG Electronics, "Discussion on physical layer procedures for NR sidelink", R1-1908906, 3GPP TSG RAN WG1 Meeting #98, Prague, CZ, Aug. 26-30, 2019, see section 2.1.

FIG. 4
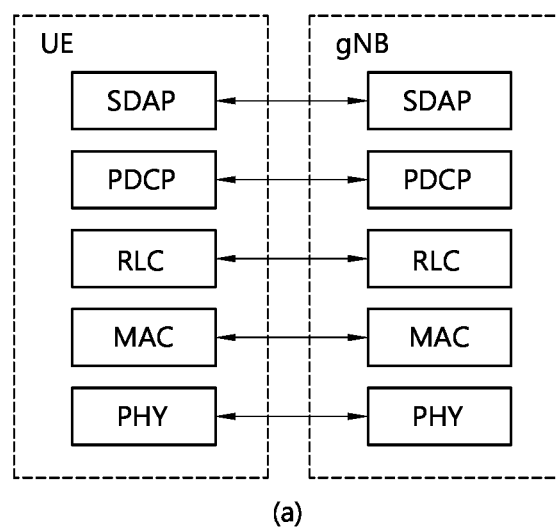
(a)
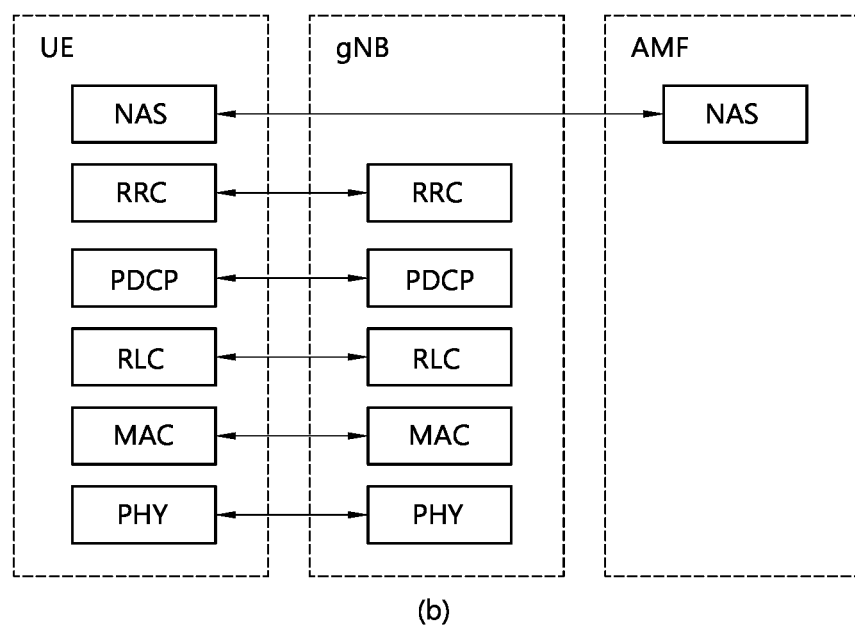
(b)

FIG. 8
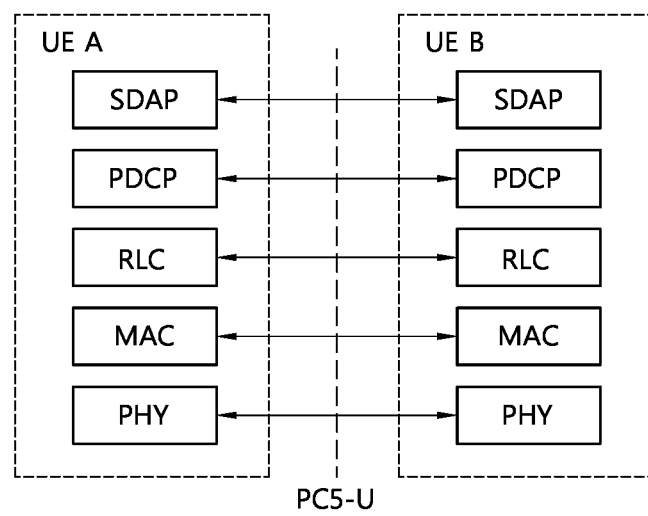
(a)
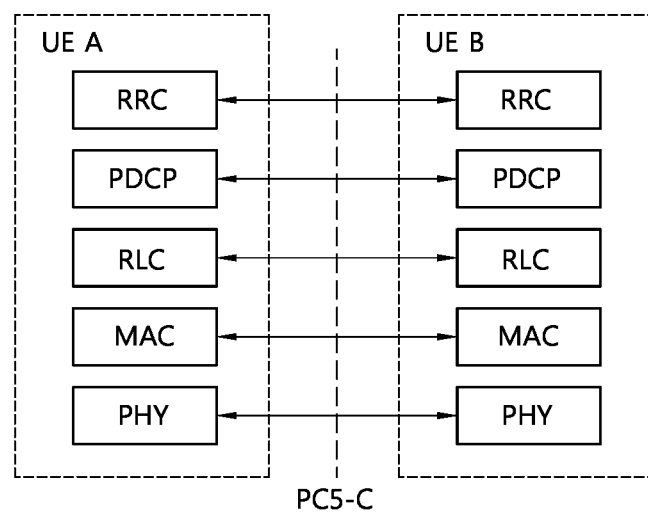
(b)

FIG. 21 receive information on SL HARQ feedback
from first device through channel — S2110

US 12,309,786 B2

METHOD AND APPARATUS FOR REPORTING HARQ FEEDBACK TO BASE STATION IN NR V2X

This application is the National Stage filing under 35 U.S.C. 371 of International Application No. PCT/KR2020/013539, filed on Oct. 6, 2020, which claims the benefit of and priority to U.S. Provisional Application No. 62/911,360, filed on Oct. 6, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, a UE may report SL HARQ feedback information to a base station through a PUCCH even if SL transmission is not performed. In this case, the UE needs to determine a priority of PUCCH transmission.

Technical Solutions

In one embodiment, a method for performing wireless communication by a first device is provided. The method may comprise: receiving, from a base station, information related to a physical uplink control channel (PUCCH) resource for reporting hybrid automatic repeat request (HARQ) feedback information and information related to a first sidelink (SL) resource; generating the HARQ feedback information based on first SL transmission being not performed on the first SL resource by the first device; and determining a priority value of the HARQ feedback information, wherein the priority value of the HARQ feedback information is a same as a largest priority value among at least one priority value related to the first SL resource.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: receive, from a base station, information related to a physical uplink control channel (PUCCH) resource for reporting hybrid automatic repeat request (HARQ) feedback information and information related to a first sidelink (SL) resource; generate the HARQ feedback information based on first SL transmission being not performed on the first SL resource by the first device; and determine a priority value of the HARQ feedback information, wherein the priority value of the HARQ feedback information is a same as a largest priority value among at least one priority value related to the first SL resource.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

FIG. 21 shows a method for a base station to receive information on SL HARQ feedback, based on an embodiment of the present disclosure.

DESCRIPTION OF EXEMPLARY EMBODIMENTS

Figure 1:
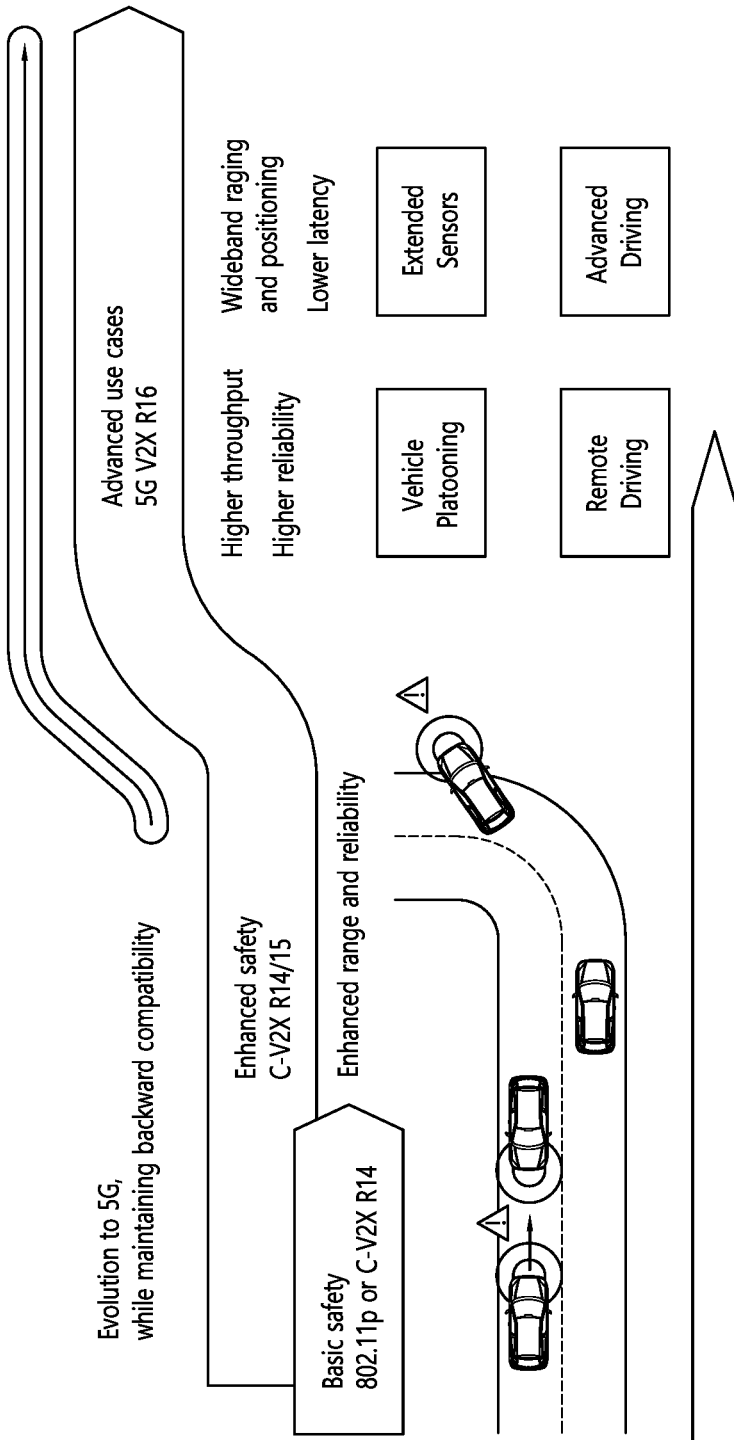
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in a uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
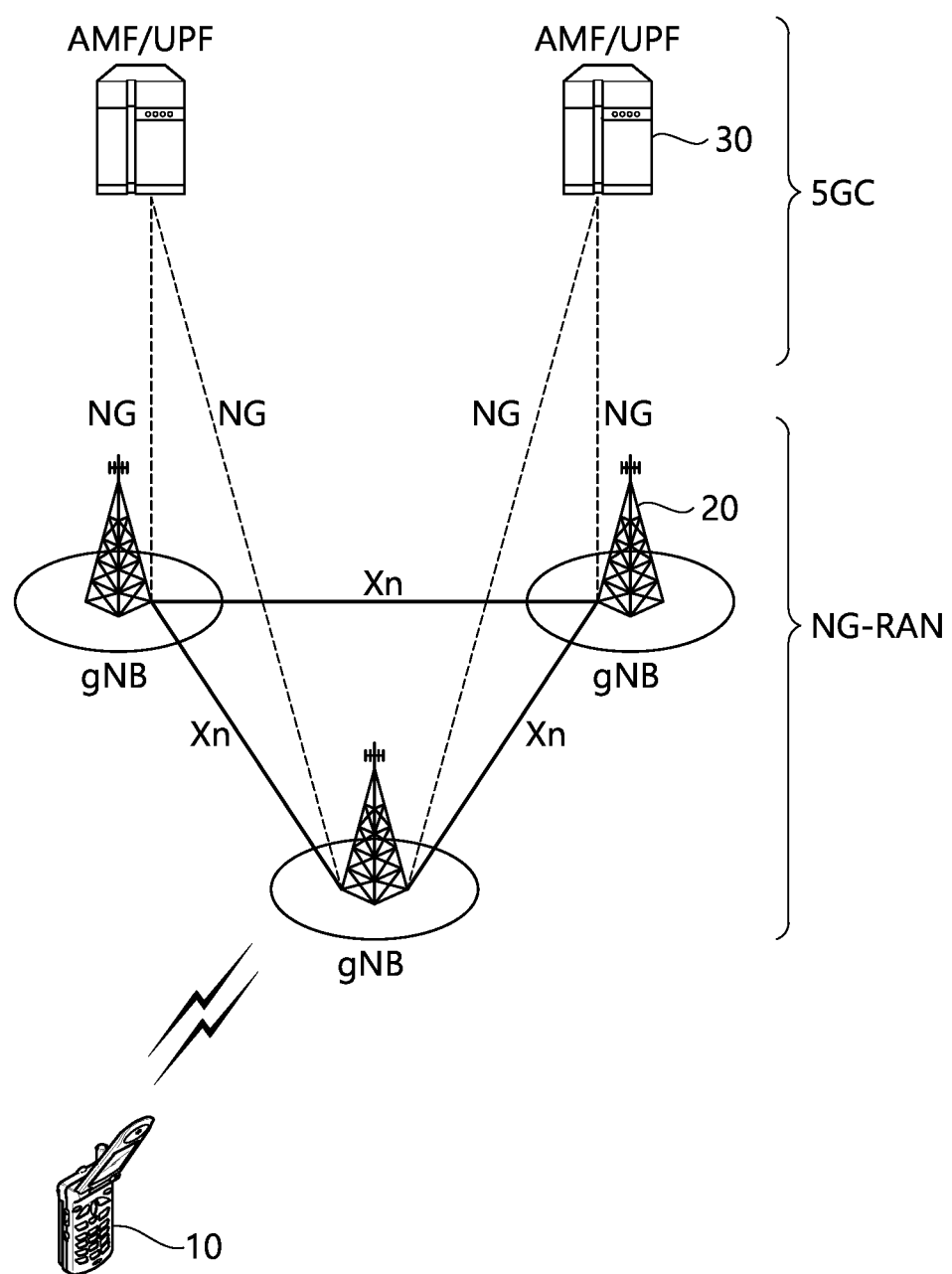
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
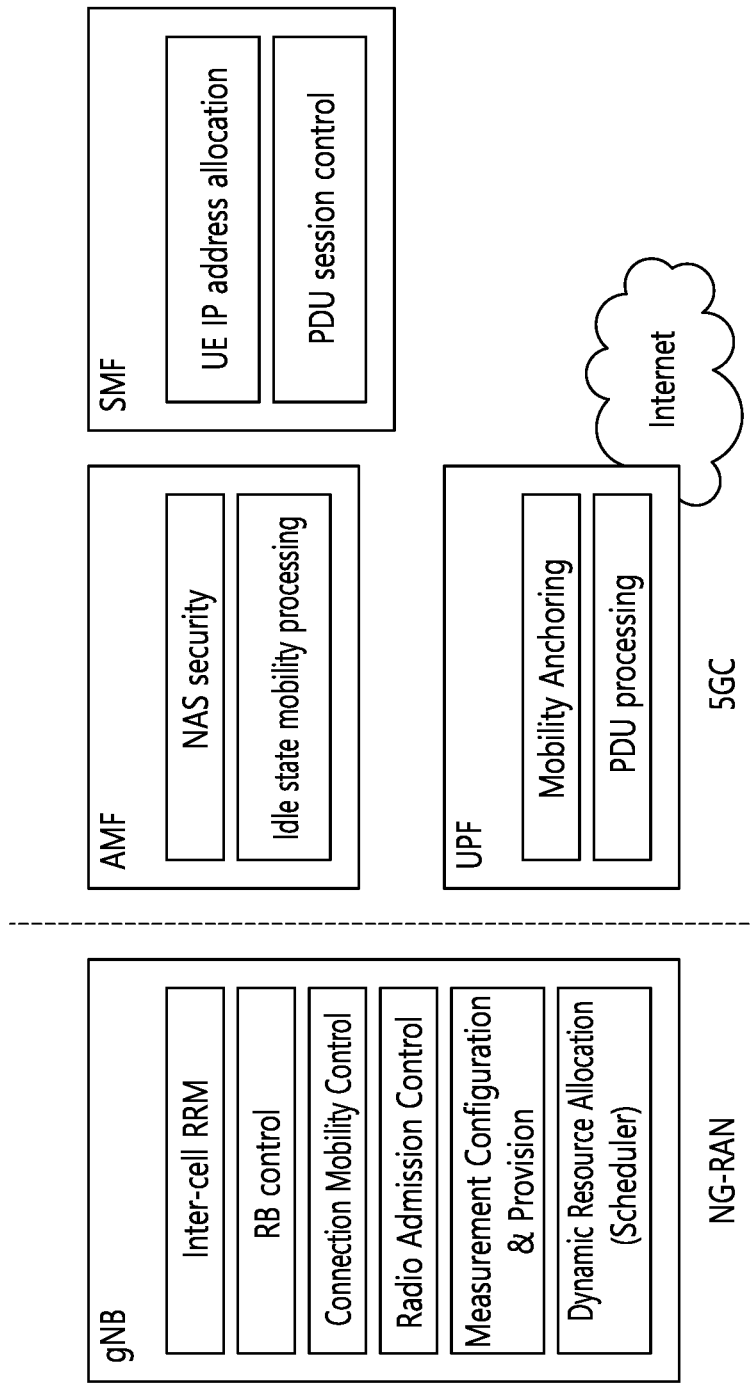
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
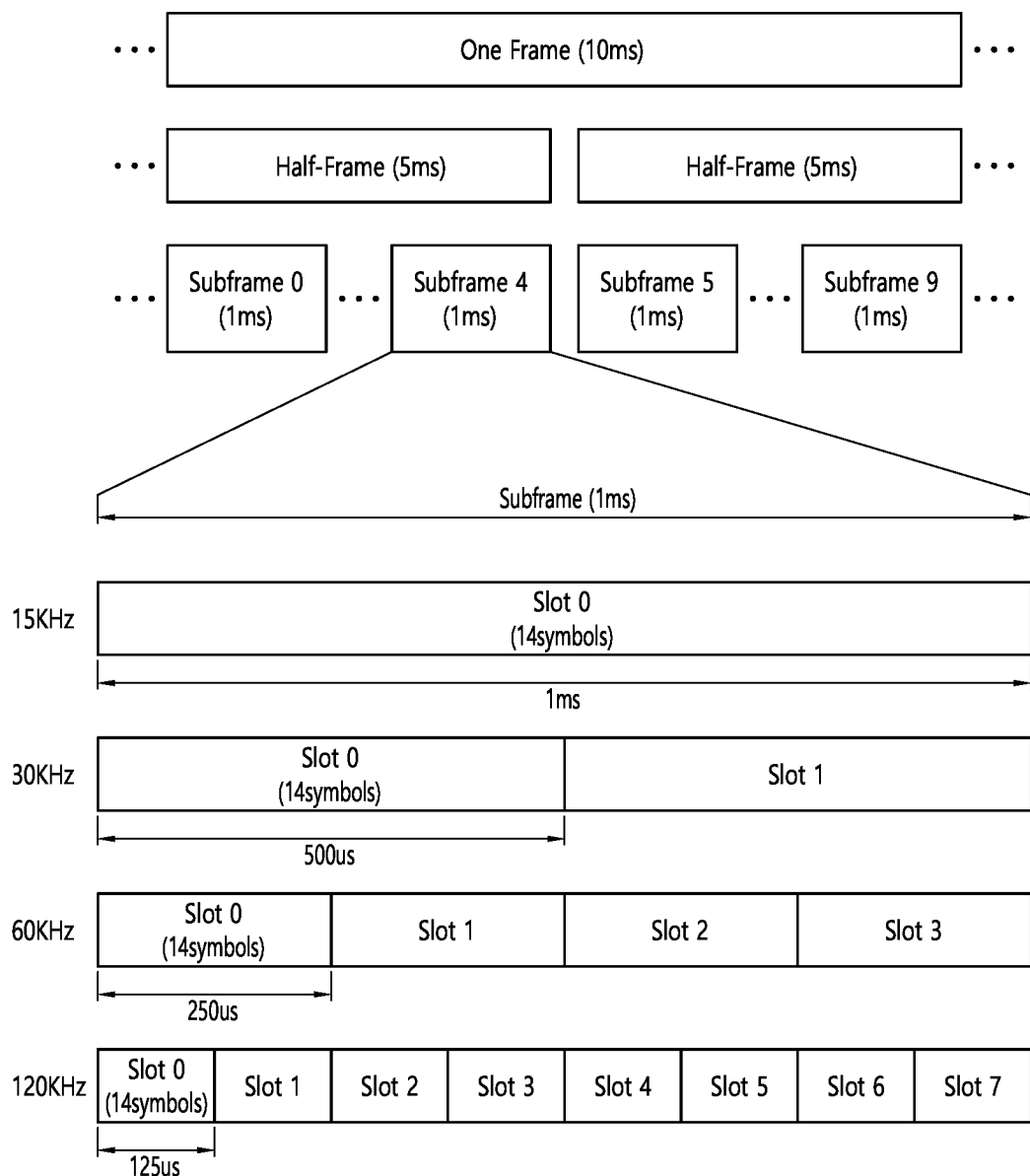
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHZ | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHZ | 60, 120, 240 kHz |

Figure 6:
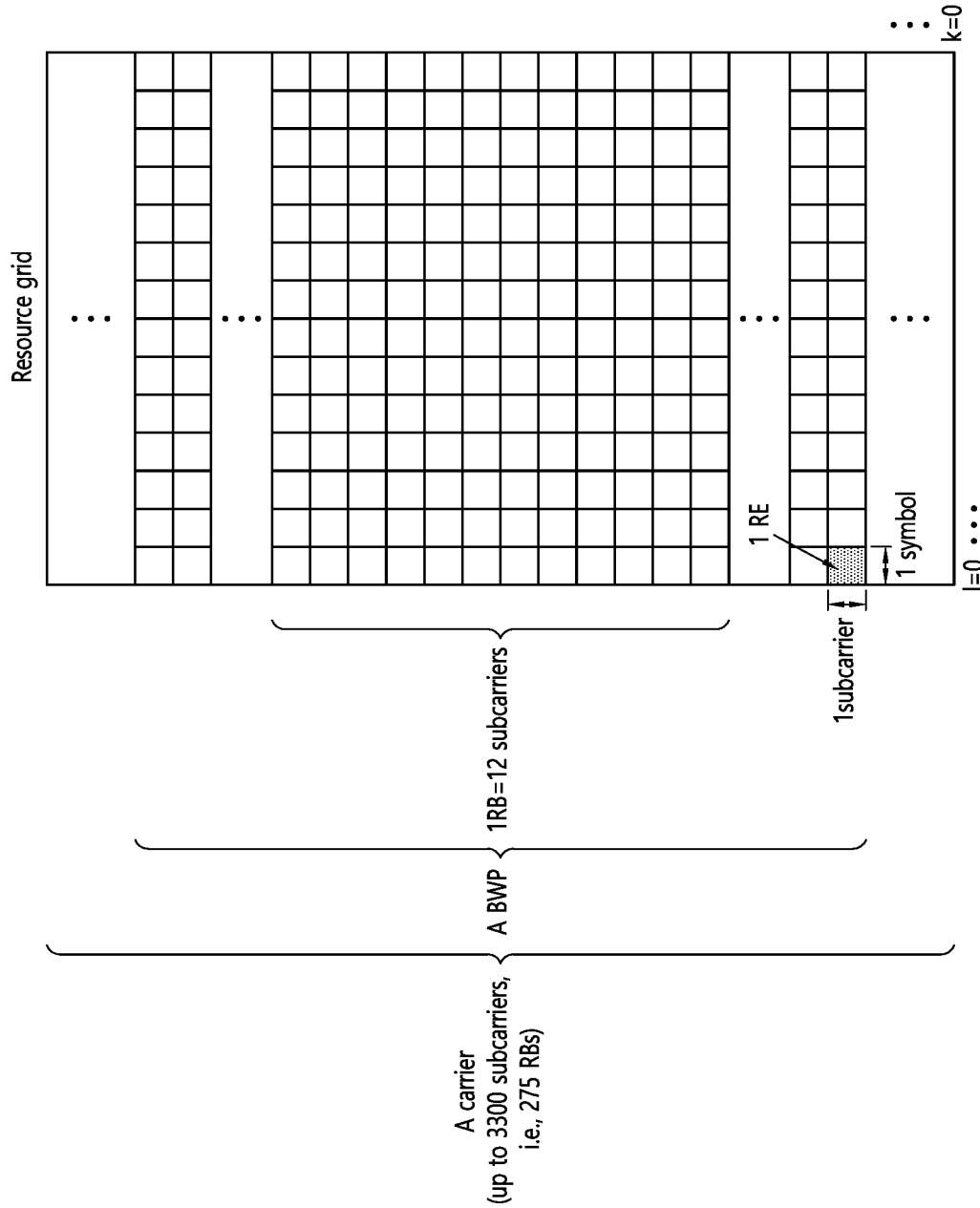
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
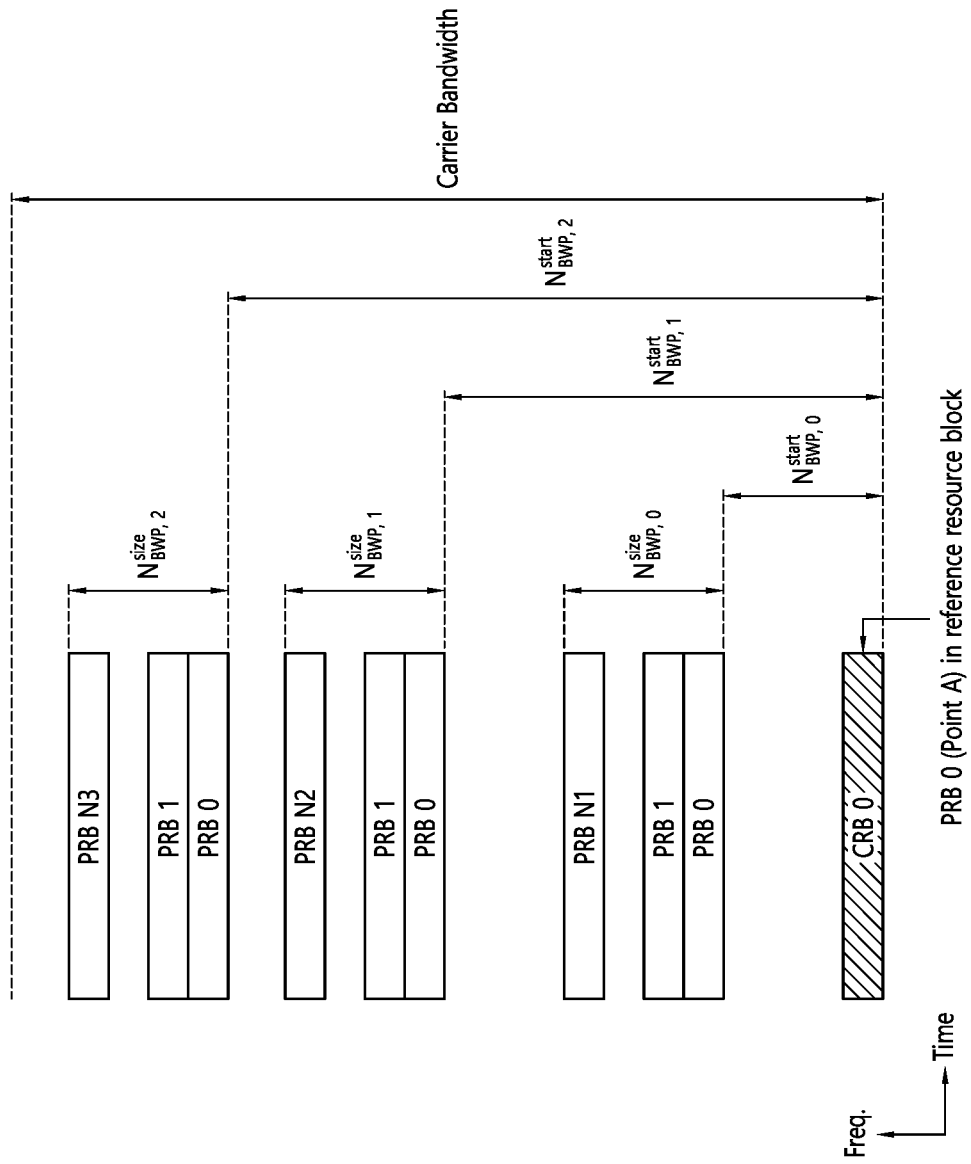
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
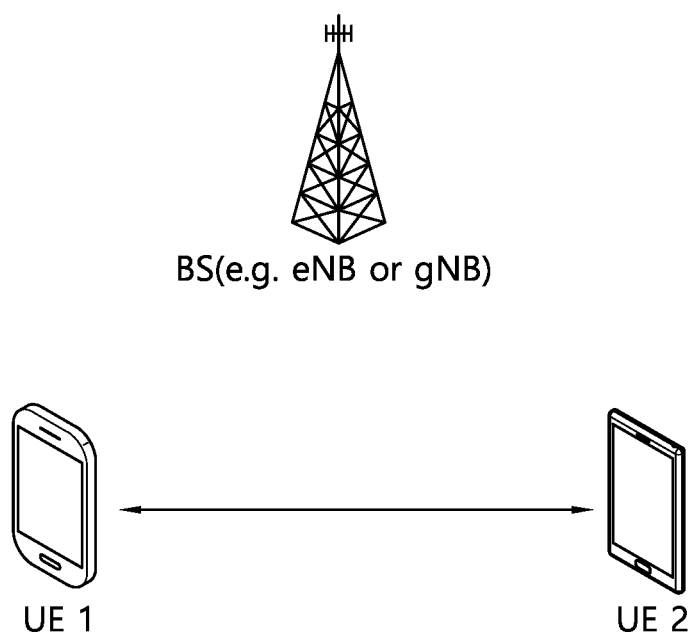
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
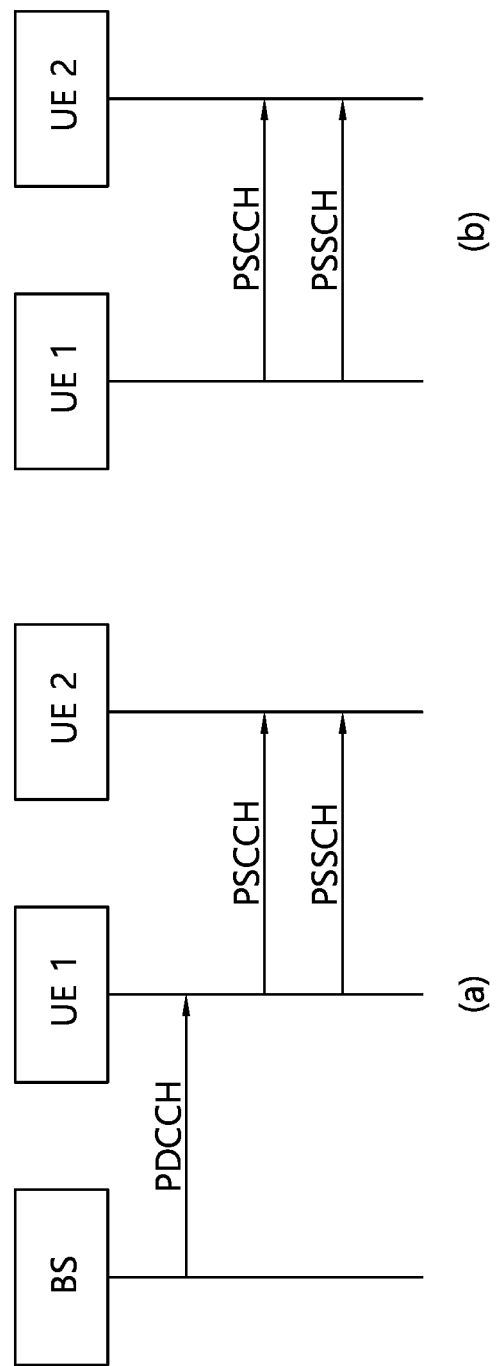
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(*b*), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
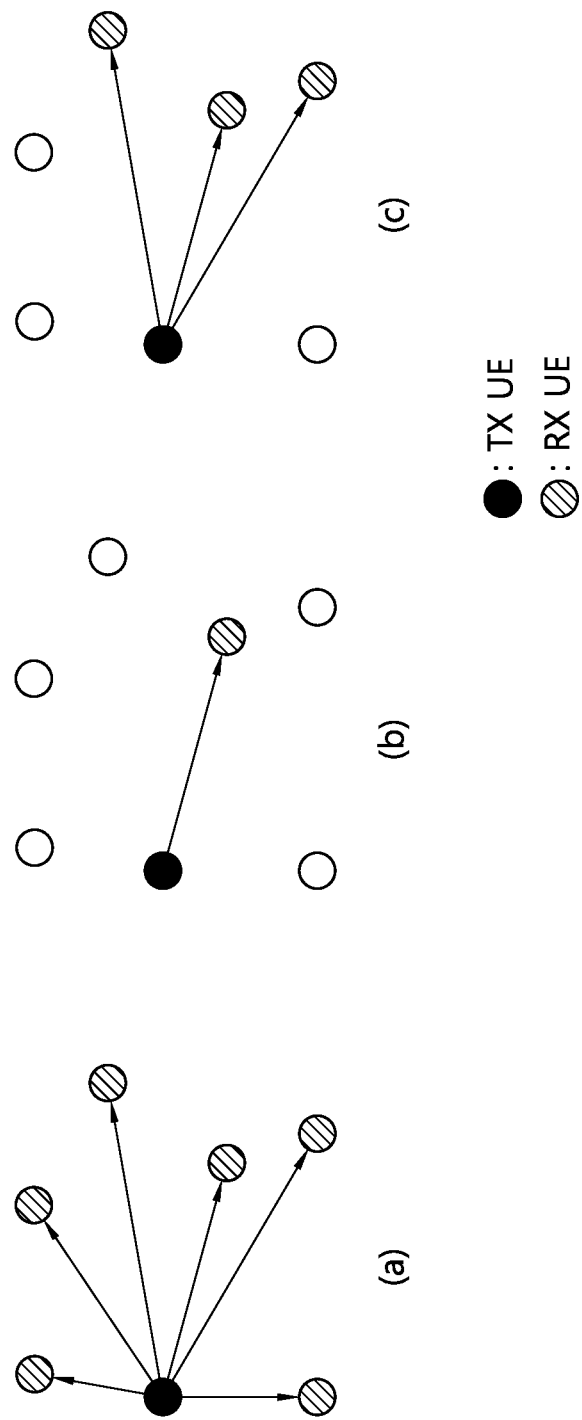
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(*a*) shows broadcast-type SL communication, FIG. 11(*b*) shows unicast type-SL communication, and FIG. 11(*c*) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Figure 12:
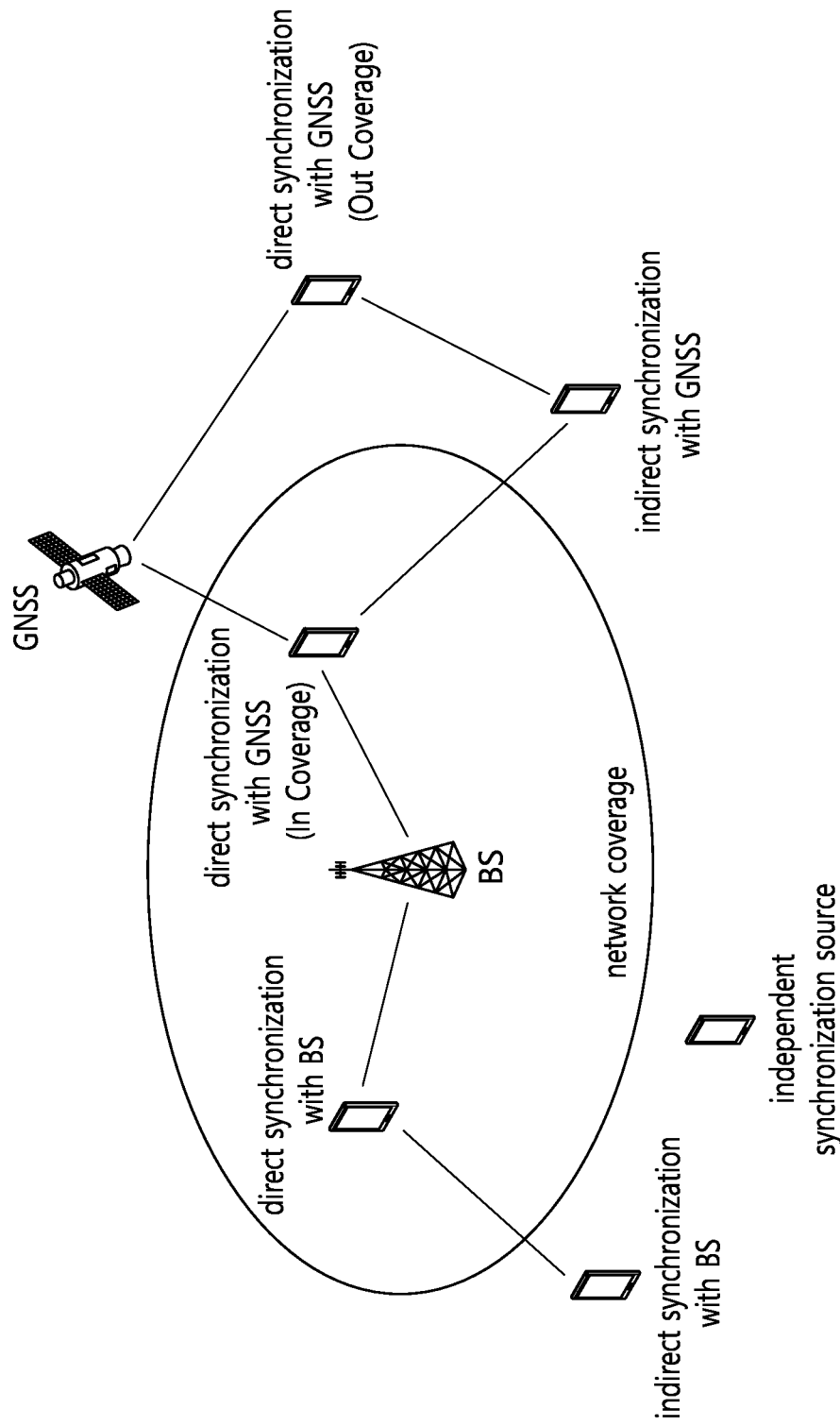
FIG. 12 shows a synchronization source or synchronization reference of V2X, based on an embodiment of the present disclosure.

FIG. 12 shows a synchronization source or synchronization reference of V2X, based on an embodiment of the present disclosure. The embodiment of FIG. 12 may be combined with various embodiments of the present disclosure.

Referring to FIG. 12, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

A SL synchronization source may be associated/related with a synchronization priority. For example, a relation between the synchronization source and the synchronization priority may be defined as shown in Table 5 or Table 6. Table 5 or Table 6 are for exemplary purposes only, and the relation between the synchronization source and the synchronization priority may be defined in various forms.

TABLE 5

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) having low priority | Remaining UE(s) having low priority |

In Table 5 or Table 6, P0 may denote a highest priority, and P6 may denote a lowest priority. In Table 5 or Table 6, the BS may include at least one of a gNB and an eNB.

Whether to use GNSS-based synchronization or BS-based synchronization may be (pre-)configured. In a single-carrier operation, the UE may derive transmission timing of the UE from an available synchronization reference having the highest priority.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or reference signals received power (RSRP).

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 13:
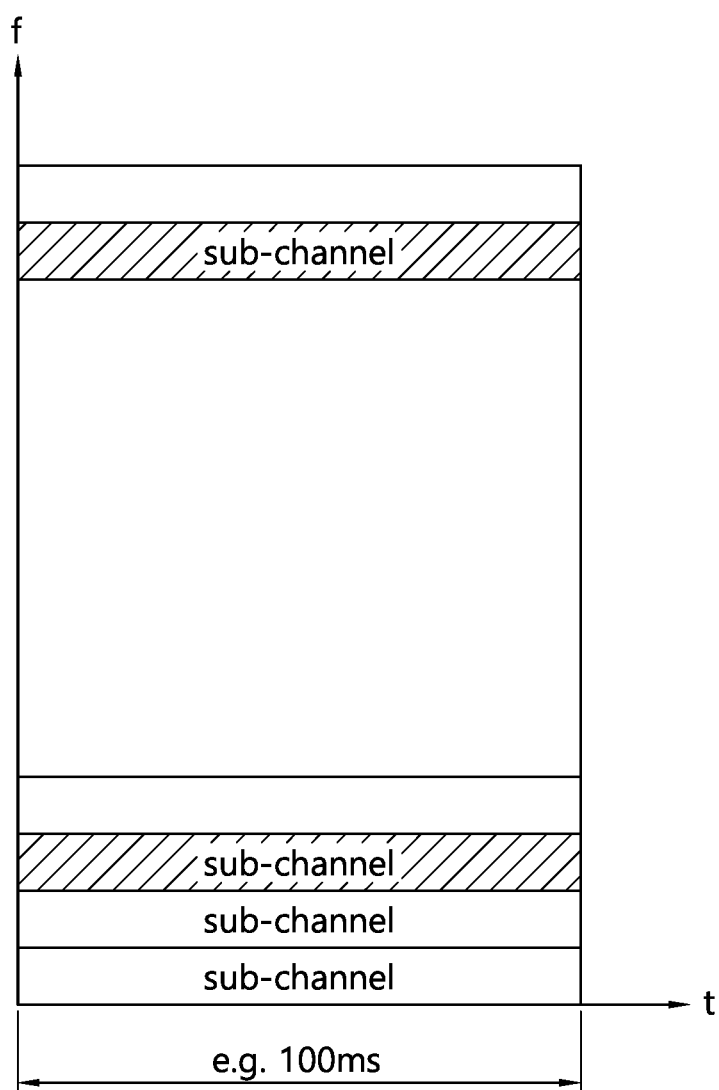
FIG. 13 shows a resource unit for CBR measurement, based on an embodiment of the present disclosure.

FIG. 13 shows a resource unit for CBR measurement, based on an embodiment of the present disclosure. The embodiment of FIG. 13 may be combined with various embodiments of the present disclosure.

Referring to FIG. 13, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 13, if it is assumed that a hatched sub-channel is a sub-channel having a value greater than or equal to a pre-configured threshold, the CBR may denote a ratio of the hatched sub-channels for a period of 100 ms. Additionally, the UE may report the CBR to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. For example, the TX UE may be a UE which transmits SL CSI-RS(s) and/or a SL CSI report request indicator to the (target) RX UE. For example, the TX UE may be a UE which transmits (pre-defined) reference signal(s) (e.g., PSSCH demodulation reference signal (DM-RS)) and/or a SL (L1) RSRP report request indicator, to the (target) RX UE, to be used for SL (L1) RSRP measurement. For example, the TX UE may be a UE which transmits a (control) channel (e.g., PSCCH, PSSCH, etc.) and/or reference signal(s) on the (control) channel (e.g., DM-RS, CSI-RS, etc.), to be used for a SL RLM operation and/or a SL RLF operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. For example, the RX UE may be a UE which performs SL CSI transmission to the TX UE based on SL CSI-RS(s) and/or a SL CSI report request indicator received from the TX UE. For example, the RX UE is a UE which transmits a SL (L1) RSRP measurement value, to the TX UE, measured based on (pre-defined) reference signal(s)

and/or a SL (L1) RSRP report request indicator received from the TX UE. For example, the RX UE may be a UE which transmits data of the RX UE to the TX UE. For example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, the TX UE may transmit at least one of the following information to the RX UE through SCI(s). Herein, for example, the TX UE may transmit at least one of the following information to the RX UE through a first SCI and/or a second SCI.

- PSSCH (and/or PSCCH) related resource allocation information (e.g., the location/number of time/frequency resources, resource reservation information (e.g., period))
- SL CSI report request indicator or SL (L1) RSRP (and/or SL (L1) RSRQ and/or SL (L1) RSSI) report request indicator
- SL CSI transmission indicator (or SL (L1) RSRP (and/or SL (L1) RSRQ and/or SL (L1) RSSI) information transmission indicator) (on a PSSCH)
- Modulation and Coding Scheme (MCS) information
- TX power information
- L1 destination ID information and/or L1 source ID information
- SL HARQ process ID information
- New Data Indicator (NDI) information
- Redundancy Version (RV) information
- (Transmission traffic/packet related) QoS information (e.g., priority information)
- SL CSI-RS transmission indicator or information on the number of antenna ports for (transmitting) SL CSI-RS
- TX UE location information or location (or distance range) information of the target RX UE (for which SL HARQ feedback is requested)
- Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, etc.

Meanwhile, in the present disclosure, for example, a PSCCH may be replaced/substituted with a SCI and/or a first SCI and/or a second SCI, or vice versa. For example, the SCI may be replaced/substituted with the PSCCH and/or the first SCI and/or the second SCI, or vice versa. For example, since the TX UE may transmit the second SCI to the RX UE through a PSSCH, the PSSCH may be replaced/substituted with the second SCI, or vice versa. For example, if SCI configuration fields are divided into two groups in consideration of a (relatively) high SCI payload size, the first SCI including a first SCI configuration field group may be referred to as a $1^{st}$ SCI or $1^{st}$-stage SCI, and the second SCI including a second SCI configuration field group may be referred to as a $2^{nd}$ SCI or $2^{nd}$-stage SCI. For example, the first SCI may be transmitted through a PSCCH. For example, the second SCI may be transmitted through a (independent) PSCCH. For example, the second SCI may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool). For example, "that A is configured" may mean "that the base station/network transmits information related to A to the UE".

Meanwhile, in the present disclosure, for example, an RB may be replaced/substituted with a subcarrier, or vice versa. For example, a packet or a traffic may be replaced/substituted with a transport block (TB) or a medium access control protocol data unit (MAC PDU) based on a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant. For example, in the CG type 1, a base station may allocate periodic resource(s) to a TX UE through an RRC message. For example, in the CG type 2, a base station may allocate periodic resource(s) to a TX UE through an RRC message, and the base station may dynamically activate or deactivate the periodic resource(s) through a DCI.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, a high priority may mean a small priority value, and a low priority may mean a large priority value. For example, Table 7 shows an example of priorities.

TABLE 7

| service or logical channel | priority value |
| --- | --- |
| service A or logical channel A | 1 |
| service B or logical channel B | 2 |
| service C or logical channel C | 3 |

Referring to Table 7, for example, service A or logical channel A related to the smallest priority value may have the highest priority. For example, service C or logical channel C related to the largest priority value may have the lowest priority.

Based on various embodiments of the present disclosure, a method for a UE to perform power control based on a priority and an apparatus supporting the same will be described.

Figure 14:
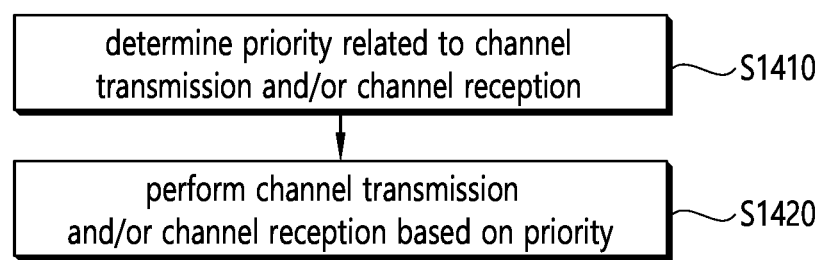
FIG. 14 shows a procedure in which a UE performs channel transmission and/or channel reception based on a priority, based on an embodiment of the present disclosure.

FIG. 14 shows a procedure in which a UE performs channel transmission and/or channel reception based on a priority, based on an embodiment of the present disclosure. The embodiment of FIG. 14 may be combined with various embodiments of the present disclosure.

Referring to FIG. 14, in step S1410, the UE may determine a priority related to channel transmission and/or channel reception. For example, if transmission of a plurality of channels by the UE partially or entirely overlaps in the time domain on the same carrier/frequency or different carriers/frequencies, the UE may consider or determine transmission and/or reception of a channel satisfying at least one condition of options 1-1 to 1-13 as a relatively high priority. Or, for example, if transmission of a plurality of channels and/or reception of a plurality of channels by the UE partially or entirely overlaps in the time domain on the same carrier/frequency or different carriers/frequencies, the UE may consider or determine transmission and/or reception satisfying at least one condition of options 1-1 to 1-13 as a relatively high priority.

1) OPTION 1-1: at least one of transmission of a channel related to a message with a relatively high priority value related to a service and/or QoS, reception of a channel related to a message with a relatively high priority value related to a service and/or QoS, transmission of a channel related to a message with a relatively low latency requirement, reception of a channel related to a message with a relatively low latency requirement, transmission of a channel related to a message with a relatively high reliability requirement, reception of a channel related to a message with a relatively high reliability requirement, transmission of a channel related to a message with a relatively long minimum communication (reach) distance requirement, and/or reception of a channel related to a message with a relatively long minimum communication (reach) distance requirement 2) OPTION 1-2: at least one of transmission of an LTE SL channel, transmission of an LTE SL channel on a Master Cell Group (MCG) or a Secondary Cell Group (SCG), transmission of an LTE Uu channel, transmission of an LTE Uu channel on a MCG or a SCG, transmission of an NR SL channel, transmission of an NR SL channel on a MCG or a SCG, transmission of an NR Uu channel, transmission of an NR Uu channel on a MCG or a SCG, reception of an LTE SL channel, reception of an LTE SL channel on a MCG or a SCG, reception of an LTE Uu channel, reception of an LTE Uu channel on a MCG or a SCG, reception of an NR SL channel, reception of an NR SL channel on a MCG or a SCG, reception of an NR Uu channel, and/or reception of an NR Uu channel on a MCG or a SCG 3) OPTION 1-3: at least one of transmission of a Uu channel, reception of a Uu channel, transmission of a SL channel, and/or reception of a SL channel 4) OPTION 1-4: at least one of transmission of a pre-configured channel, reception of a pre-configured channel, transmission of a pre-configured SL channel, reception of a pre-configured SL channel, transmission of a pre-configured Uu channel, and/or reception of a pre-configured Uu channel, e.g., at least one of transmission or reception of a synchronization signal, transmission or reception of a HARQ feedback channel, transmission or reception of a CSI feedback channel, transmission or reception of an RSRP feedback channel, and/or transmission or reception of a PRACH 5) OPTION 1-5: transmission of a randomly selected channel and/or reception of a randomly selected channel 6) OPTION 1-6: at least one of transmission of a channel on a carrier/frequency or a resource pool with a relatively small index, reception of a channel on a carrier/frequency or a resource pool with a relatively small index, transmission of a channel on a carrier/frequency or a resource pool with a relatively large index, reception of a channel on a carrier/frequency or a resource pool with a relatively large index, transmission of a channel on a pre-configured specific carrier/frequency or a pre-configured specific resource pool, and/or reception of a channel on a pre-configured specific carrier/frequency or a pre-configured specific resource pool 7) OPTION 1-7: transmission of a channel and/or reception of a channel 8) OPTION 1-8: at least one of transmission of a channel related to a pre-configured cast type, reception of a channel related to a pre-configured cast type, transmission of a channel related to a pre-configured destination UE, reception of a channel related to a pre-configured destination UE, transmission of a channel related to a pre-configured (L1 or L2) destination ID, reception of a channel related to a pre-configured (L1 or L2) destination ID, transmission of a channel related to a pre-configured (L1 or L2) source ID, reception of a channel related to a pre-configured (L1 or L2) source ID, transmission of a channel related to a pre-configured service type, reception of a channel related to a pre-configured service type, transmission of a channel related to a pre-configured QoS parameter, and/or reception of a channel related to a pre-configured QoS parameter 9) OPTION 1-9: at least one of transmission of a channel on a resource pool or a carrier/frequency with a relatively high congestion level (e.g., CBR), reception of a channel on a resource pool or a carrier/frequency with a relatively high congestion level, transmission of a channel on a resource pool or a carrier/frequency with a relatively low congestion level, reception of a channel on a resource pool or a carrier/frequency with a relatively low congestion level, transmission of a channel on a resource pool or a carrier/frequency with a relatively high channel occupancy ratio (CR), reception of a channel on a resource pool or a carrier/frequency with a relatively high channel occupancy ratio, transmission of a channel on a resource pool or a carrier/frequency with a relatively low channel occupancy ratio, and/or reception of a channel on a resource pool or a carrier/frequency with a relatively low channel occupancy ratio 10) OPTION 1-10: transmission of a channel requiring relatively high power 11) OPTION 1-11: at least one of transmission of a channel related to MODE 1 operation, reception of a channel related to MODE 1 operation, transmission of a channel related to MODE 2 operation, and/or reception of a channel related to MODE 2 operation 12) OPTION 1-12: at least one of transmission of a channel related to initial transmission of a TB, reception of a channel related to initial transmission of a TB, transmission of a channel related to retransmission of a TB, and/or reception of a channel related to retransmission of a TB 13) OPTION 1-13: transmission of a channel with a relatively high (associated) logical channel priority value and/or reception of a channel with a relatively high (associated) logical channel priority value In step S1420, the UE may perform channel transmission and/or channel reception based on the priority.

For example, transmission of a plurality of channels by the UE may partially or entirely overlap in the time domain on the same carrier/frequency. Alternatively, transmission of a plurality of channels and/or reception of a plurality of channels by the UE may partially or entirely overlap in the time domain on the same carrier/frequency. Hereinafter, for convenience of description, the above-described case may be referred to as CASE A. Based on an embodiment of the present disclosure, in the case of CASE A, the UE may be configured to omit/skip transmission and/or reception of a channel related to a relatively low priority. For example, the UE may only perform transmission and/or reception of a channel related to a relatively high priority.

For example, transmission of a plurality of channels by the UE may partially or entirely overlap in the time domain on different carriers/frequencies of intra-band. Alternatively, transmission of a plurality of channels and/or reception of a plurality of channels by the UE may partially or entirely overlap in the time domain on different carriers/frequencies of intra-band. Hereinafter, for convenience of description, the above-described case may be referred to as CASE B. Based on an embodiment of the present disclosure, in the case of CASE B, the UE may be configured to omit/skip transmission and/or reception of a channel related to a relatively low priority. For example, the UE may only perform transmission and/or reception of a channel related to a relatively high priority.

For example, transmission of a plurality of channels by the UE may partially or entirely overlap in the time domain on different carriers/frequencies of intra-band or inter-band. Hereinafter, for convenience of description, the above-described case may be referred to as CASE C. Based on an embodiment of the present disclosure, in the case of CASE C, the UE may allocate required power staring from transmission of a channel related to a relatively high priority, and the UE may (sequentially) allocate the remaining transmit power to transmission of a channel related to the next higher priority in a descending priority order. For example, if the sum of power required for a plurality of channels transmitted at the same time is greater than the maximum transmit power of the UE, the UE may allocate required power staring from transmission of a channel related to a relatively high priority, and the UE may (sequentially) allocate the remaining transmit power to transmission of a channel related to the next higher priority in a descending priority order. For example, the plurality of channels transmitted at the same time may be a plurality of channels transmitted through frequency division multiplexing (FDM) at the same time. For example, the plurality of channels transmitted at the same time may be a plurality of channels transmitted in different frequency domains at the same time.

For example, in the case of at least one of CASE A, CASE B and/or CASE C, if transmission and/or reception of a plurality of channels related to messages having the same priority value related to service and/or QoS partially or entirely overlaps in the time domain, the UE may determine or consider transmission or reception of a channel satisfying at least one of the options 1-1 to 1-13 as a relatively high priority. In addition, for example, the UE may omit/skip transmission or reception of a channel related to a relatively low priority. For example, in the case of CASE A and/or CASE B, the UE may omit/skip transmission or reception of a channel related to a relatively low priority. For example, the UE may only perform transmission or reception of a channel related to a relatively high priority.

For example, in the case of at least one of CASE A, CASE B and/or CASE C, if transmission of a plurality of channels related to messages having the same priority value related to service and/or QoS partially or entirely overlaps in the time domain, the UE may determine or consider transmission of a channel satisfying at least one of the options 1-1 to 1-13 as a relatively high priority. In addition, for example, the UE may allocate power for transmission of a plurality of channels. For example, in the case of CASE C, the UE may allocate required power staring from transmission of a channel related to a relatively high priority, and the UE may (sequentially) allocate the remaining transmit power to transmission of a channel related to the next higher priority in a descending priority order. For example, if the sum of power required for a plurality of channels transmitted at the same time is greater than the maximum transmit power of the UE, the UE may allocate required power staring from transmission of a channel related to a relatively high priority, and the UE may (sequentially) allocate the remaining transmit power to transmission of a channel related to the next higher priority in a descending priority order.

For example, for transmission and/or reception of a plurality of channels related to the same priority, the UE may determine or consider transmission and/or reception of a channel that satisfies at least one of the options 1-1 to 1-13 as transmission and/or reception of a channel with a relatively high priority. For example, for transmission and/or reception of a plurality of channels related to the same priority, in order for TIE-BREAKING, the UE may determine or consider transmission and/or reception of a channel that satisfies at least one of the options 1-1 to 1-13 as transmission and/or reception of a channel with a relatively high priority. Accordingly, for transmission and/or reception of a plurality of channels related to the same priority, the UE may finally determine a priority of transmission and/or reception. In addition, for example, the UE may omit/skip transmission and/or reception of a channel with a low priority, or may perform only transmission and/or reception of a channel with a high priority. Alternatively, for example, the UE may preferentially allocate power to transmission of a channel with a high priority. Alternatively, for example, for transmission of a plurality of channels related to the same priority, the UE may distribute (remaining) transmit power at the same ratio. For example, in the case of CASE C, for transmission of a plurality of channels related to the same priority, the UE may distribute (remaining) transmit power at the same ratio. Alternatively, for example, transmission and/or reception of a plurality of channels related to the same priority may be handled by the UE implementation.

Meanwhile, for example, in the case of transmission of a channel related to at least one of types 1 to 6, it may be difficult for the UE to determine an associated logical channel priority (LCP) value. For example, in the case of transmission of a channel related to at least one of types 1 to 6, it may be difficult for the UE to directly determine a priority of an associated logical channel.

1) Type 1: a PUCCH for the UE to transmit HARQ feedback information for a PDSCH to the base station
2) Type 2: a PUCCH for the UE to transmit CSI information related to DL communication to the base station
3) Type 3: at least one of a PUSCH for the UE to transmit only (aperiodic) CSI information related to DL communication to the base station, a PUSCH for the UE to transmit only HARQ feedback information for a PDSCH to the base station, and/or a PUSCH for the UE to transmit only (aperiodic) CSI information related to DL communication and HARQ feedback information for a PDSCH to the base station
4) Type 4: a sounding reference signal (SRS) transmitted by the UE to the base station in order for the base station to estimate a UL channel
5) Type 5: at least one of a PUCCH for the MODE 1 TX UE to report only SL HARQ feedback information to the base station, a PUCCH for the MODE 1 TX UE to report only SL HARQ feedback information received from the RX UE to the base station, a PUCCH for the MODE 1 TX UE to transmit SL HARQ feedback information to the base station, a PUCCH for the MODE 1 TX UE to transmit CSI information related to DL communication to the base station, and/or a PUCCH for the MODE 1 TX UE to transmit HARQ feedback information for a PDSCH to the base station
6) Type 6: at least one of a PUSCH for the MODE 1 TX UE to report only SL HARQ feedback information to the base station, a PUSCH for the MODE 1 TX UE to transmit SL HARQ feedback information to the base station, a PUSCH for the MODE 1 TX UE to transmit (aperiodic) CSI information related to DL communication to the base station, and/or a PUSCH for the MODE 1 TX UE to transmit HARQ feedback information for a PDSCH to the base station Accordingly, the UE needs to designate/derive/determine an LCP value or a priority value related to the above-described type of the channel. For example, after the UE determines an LCP value or a priority value related to the above-described type of the channel, the UE may perform a Logical Channel Prioritization (LCP) procedure. For example, the LCP procedure may be performed by the MAC layer of the UE. For example, the LCP procedure may include: selecting by the UE logical channel(s) and allocating resources to the logical channel(s) based on the priority of the logical channel(s). For example, the UE may generate a MAC PDU based on a priority of each logical channel and a type of a MAC control element (CE). In addition, for example, the MAC layer of the UE may deliver the MAC PDU to the physical layer of the UE. In addition, for example, the physical layer of the UE may generate packets by adding CRC to the MAC PDU. In addition, for example, the physical layer of the UE may perform channel coding and modulation for the packets. In addition, for example, the physical layer of the UE may convert the packets into radio signals and transmit it.

Based on various embodiments of the present disclosure, the UE may efficiently perform the transmission/reception skip operation and/or the power allocation operation based on the above-described priority.

Figure 15:
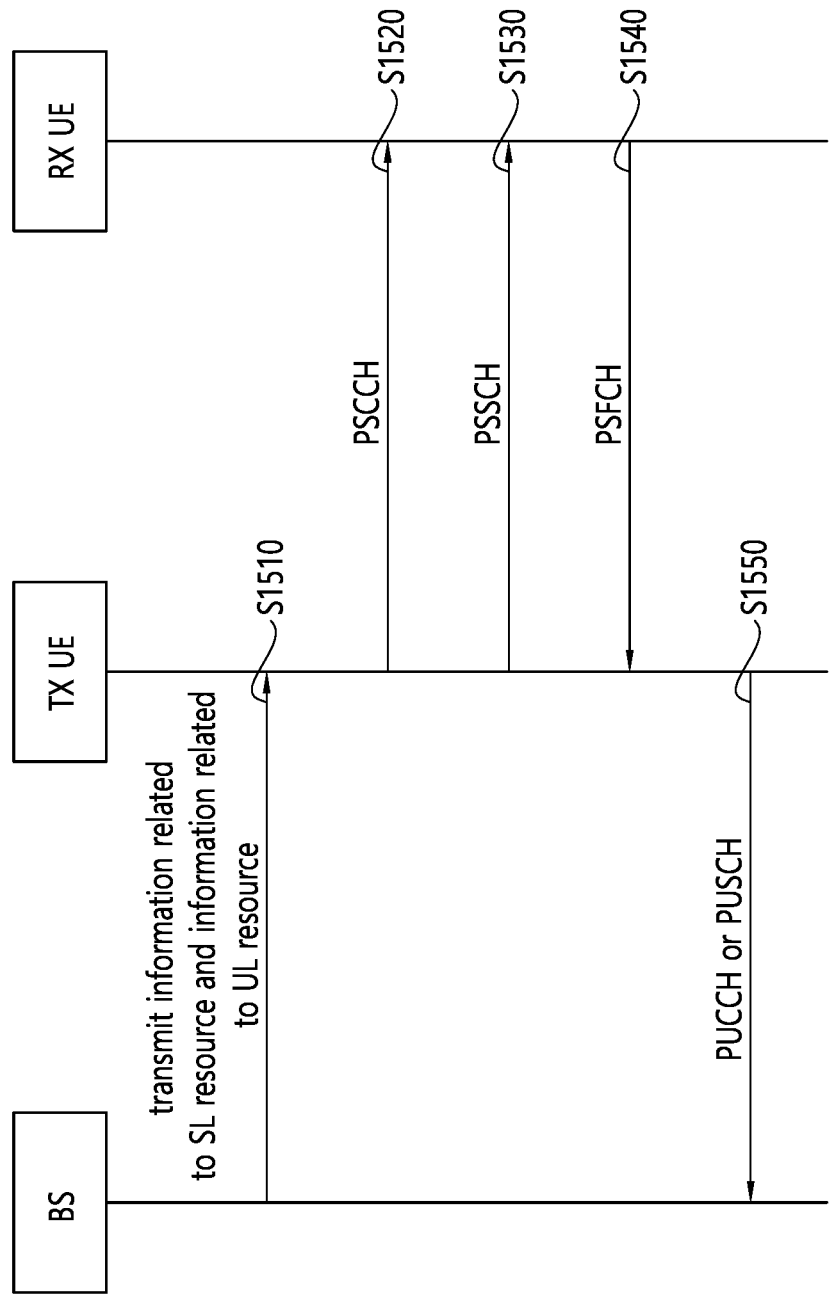
FIG. 15 shows a procedure for a TX UE to report SL HARQ feedback information to a base station, based on an embodiment of the present disclosure.

FIG. 15 shows a procedure for a TX UE to report SL HARQ feedback information to a base station, based on an embodiment of the present disclosure. The embodiment of FIG. 15 may be combined with various embodiments of the present disclosure.

Referring to FIG. 15, in step S1510, the base station may transmit information related to a SL resource and information related to a UL resource to the TX UE. For example, in the case of CG type 1-based resource allocation, the base station may allocate/configure the SL resource and the UL resource to the TX UE through an RRC message. For example, in the case of CG type 2-based resource allocation, the base station may allocate/configure the SL resource and the UL resource to the TX UE through an RRC message and a DCI. For example, in the case of DG-based resource allocation, the base station may allocate/configure the SL resource and the UL resource to the TX UE through a DCI. For example, the SL resource may be a resource related to PSCCH transmission and/or PSSCH transmission. For example, the UL resource may be a resource related to PUCCH transmission. For example, the UL resource may be a resource related to PUSCH transmission.

Figure 16:
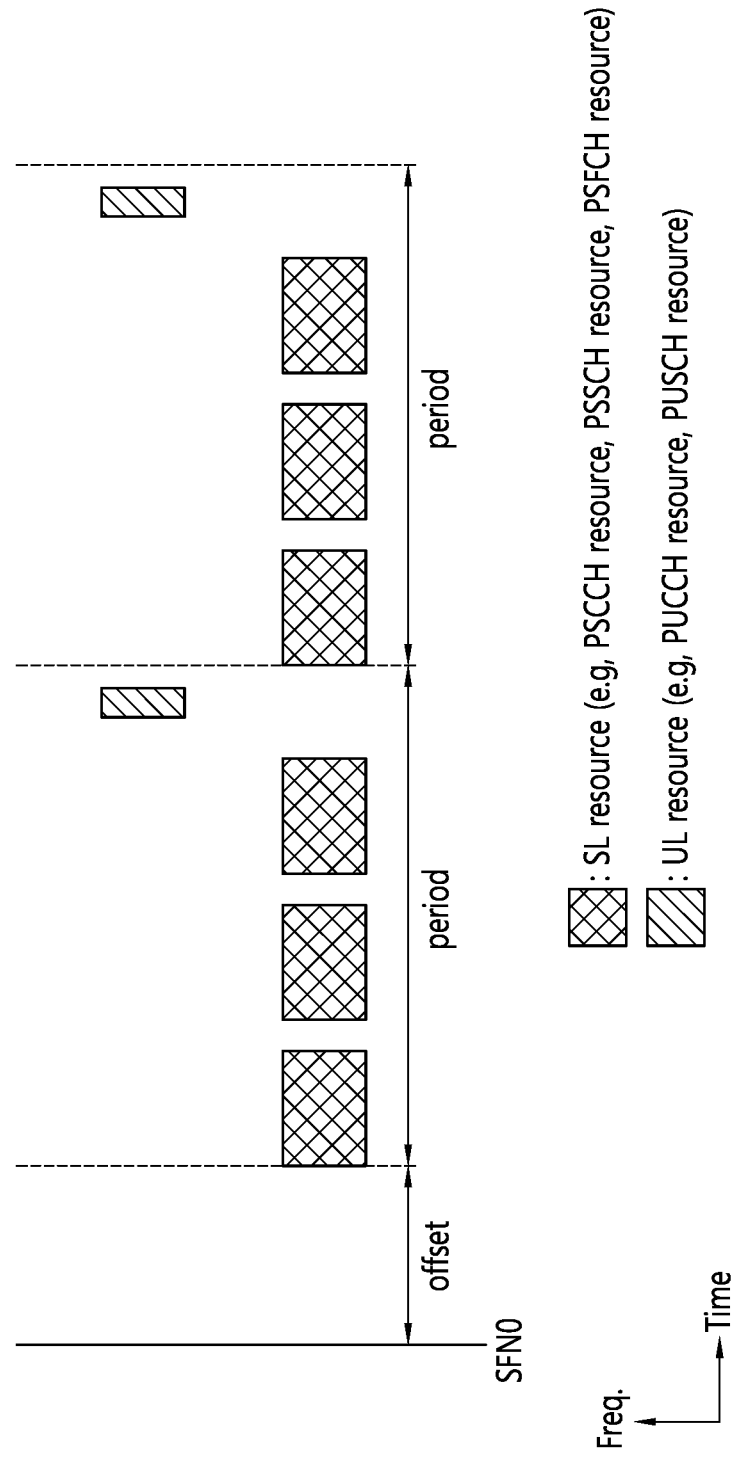
FIG. 16 shows an example of CG type 1 or CG type 2-based resource allocation, based on an embodiment of the present disclosure.

FIG. 16 shows an example of CG type 1 or CG type 2-based resource allocation, based on an embodiment of the present disclosure. The embodiment of FIG. 16 may be combined with various embodiments of the present disclosure.

Referring to FIG. 16, the base station may allocate periodic resources to the TX UE through a DCI and/or an RRC messages related to the CG.

Referring back to FIG. 15, in step S1520, the TX UE may transmit a PSCCH to the RX UE based on information related to the SL resource. In step S1530, the TX UE may transmit a PSSCH related to the PSCCH to the RX UE.

In step S1540, the TX UE may receive SL HARQ feedback information from the RX UE through a PSFCH related to the PSSCH. For example, the TX UE and the RX UE may determine a PSFCH resource related to the PSSCH, and the TX UE may receive SL HARQ feedback from the RX UE on the PSFCH resource.

In step S1550, the TX UE may transmit SL HARQ feedback information to the base station. Herein, for example, if the TX UE receives SL HARQ feedback information from the RX UE, the SL HARQ feedback information may be SL HARQ feedback information received from the RX UE. For example, if the TX UE receives SL HARQ feedback information from the RX UE, the SL HARQ feedback information may be HARQ feedback information generated by the TX UE based on the SL HARQ feedback information received from the RX UE. For example, if the TX UE does not receive SL HARQ feedback information from the RX UE, the SL HARQ feedback information may be HARQ feedback information generated by the TX UE.

Hereinafter, a method for the TX UE to report SL HARQ feedback information to the base station will be described in more detail.

Figure 17:
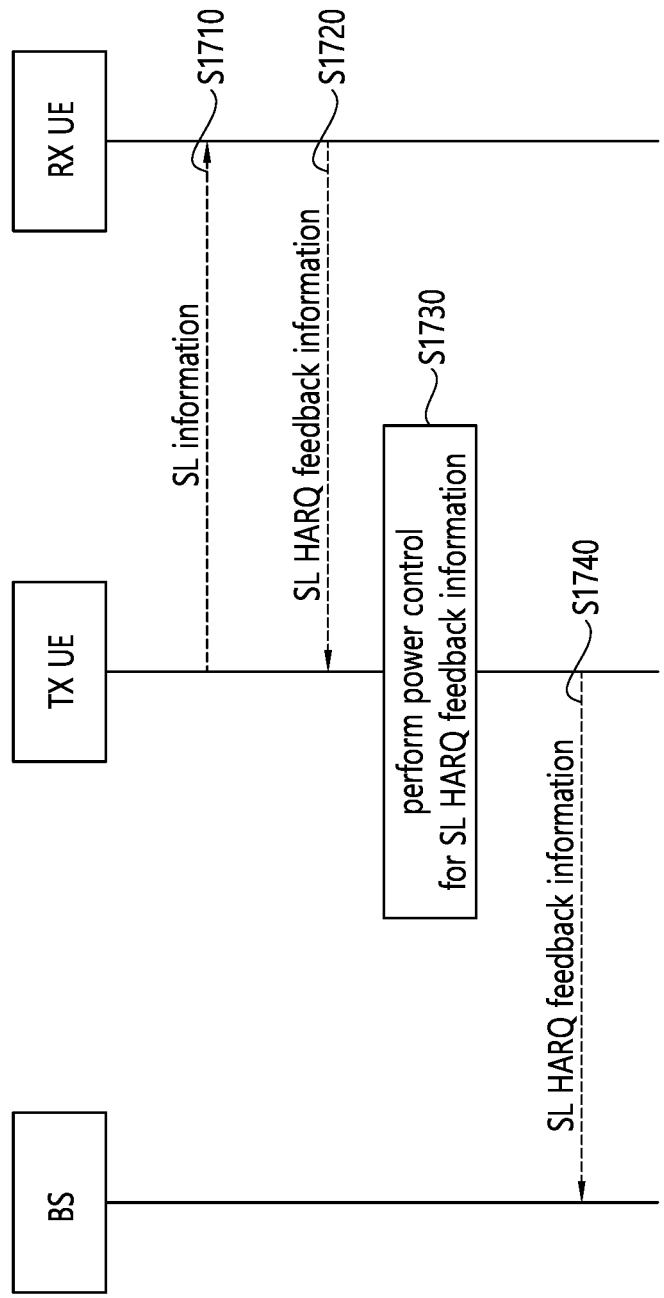
FIG. 17 shows a procedure for a TX UE to report SL HARQ feedback information to a base station, based on an embodiment of the present disclosure.

FIG. 17 shows a procedure for a TX UE to report SL HARQ feedback information to a base station, based on an embodiment of the present disclosure. The embodiment of FIG. 17 may be combined with various embodiments of the present disclosure.

Referring to FIG. 17, in step S1710, the TX UE may transmit sidelink information to the RX UE. For example, the TX UE may be a MODE 1 TX UE. For example, the sidelink information may be transmitted through a PSSCH and/or a PSCCH. For example, the sidelink information may include at least one of a sidelink message, a sidelink packet, a sidelink service, sidelink data, sidelink control information, and/or a sidelink transport block (TB).

In step S1720, the TX UE may receive SL HARQ feedback information for the sidelink information from the RX UE. For example, the SL HARQ feedback information may be received through a PSFCH.

In step S1730, the TX UE may determine a priority of a first channel through which SL HARQ feedback information is transmitted. For example, the first channel may include a PUCCH and/or a PUSCH. In addition, for example, the TX UE may perform power control for transmission of the first channel based on the priority. For example, in the case of at least one of CASE A, CASE B and/or CASE C, if transmission and/or reception of a plurality of channels related to messages having the same priority partially or entirely overlap in the time domain, the TX UE may determine or consider transmission or reception of a channel satisfying at least one of the options 1-1 to 1-13 as a relatively high priority.

For example, in the case of a channel related to the type 5 and/or the type 6, the TX UE may know a priority of sidelink information associated with each SL HARQ feedback information. For example, the priority may be a service-related priority and/or a QoS-related priority.

For example, the TX UE may select or determine or consider the minimum value, among priority values of sidelink information associated with SL HARQ feedback information transmitted through the first channel, as a priority of transmission of the first channel. For example, the TX UE may transmit at least one PSSCH to the RX UE, and the TX UE may receive at least one SL HARQ feedback information from the RX UE through at least one PSFCH related to the at least one PSSCH. In this case, each priority value of the at least one SL HARQ feedback information may be the same as each priority value of the at least one PSSCH transmission. Thereafter, the TX UE may transmit the at least one SL HARQ feedback information to the base station through the PUCCH. In this case, a priority value of PUCCH transmission including the at least one SL HARQ feedback information may be the smallest value among priority values of the at least one of SL HARQ feedback information. For example, the TX UE may determine the priority value of the PUCCH transmission including the at least one SL HARQ feedback information based on Table 8.

TABLE 8

After a UE transmits PSSCHs and receives PSFCHs in corresponding PSFCH resource occasions, the priority value of HARQ-ACK information is same as the priority value of the PSSCH transmissions that is associated with the PSFCH reception occasions providing the HARQ-ACK information.
A priority value of a PUCCH transmission with one or more sidelink HARQ-ACK information bits is the smallest priority value for the one or more HARQ-ACK information bits.

For example, the TX UE may select or determine or consider the maximum value, among priority values of sidelink information associated with SL HARQ feedback information transmitted through the first channel, as a priority of transmission of the first channel. For example, the TX UE may select or determine or consider the average value of priority values of sidelink information associated with SL HARQ feedback information transmitted through the first channel, as a priority of transmission of the first channel. For example, the TX UE may select or determine or consider the weighted average value of priority values of sidelink information associated with SL HARQ feedback information transmitted through the first channel, as a priority of transmission of the first channel.

For example, the proposed method can be limitedly applied only if the TX UE actually transmits (at least one) sidelink information to the RX UE. For example, the proposed method can be limitedly applied only if a PUCCH through which SL HARQ feedback information is reported and a PUCCH through which HARQ feedback information for a PSDCH is reported are transmitted based on time division multiplexing (TDM). For example, the proposed method can be limitedly applied only if SL HARQ feedback information and HARQ feedback information for a PSDCH are not multiplexed in the same PUCCH.

In step S1740, the TX UE may report the SL HARQ feedback information to the base station through the first channel. For example, the TX UE may report the SL HARQ feedback information to the base station through the first channel, by using transmit power allocated for transmission of the first channel.

For example, if the priority related to transmission of the first channel is relatively low compared to other transmission, the TX UE may not transmit the SL HARQ feedback information to the base station. For example, if the priority value related to transmission of the first channel is larger than priority value(s) related to other transmission, the TX UE may not transmit the SL HARQ feedback information to the base station. For example, if the priority related to transmission of the first channel is relatively high compared to other transmission, the TX UE may transmit the SL HARQ feedback information to the base station. For example, if the priority value related to transmission of the first channel is smaller than priority value(s) related to other transmission, the TX UE may transmit the SL HARQ feedback information to the base station.

For example, if the priority related to transmission of the first channel is relatively high compared to other transmission, the TX UE may preferentially allocate transmit power to transmission of the first channel. For example, if the priority related to transmission of the first channel is relatively high compared to other transmission, the TX UE may preferentially perform transmission of the first channel. For example, if the priority value related to transmission of the first channel is smaller than priority value(s) related to other transmission, the TX UE may preferentially allocate transmit power to transmission of the first channel. For example, if the priority value related to transmission of the first channel is smaller than priority value(s) related to other transmission, the TX UE may preferentially perform transmission of the first channel.

Figure 18:
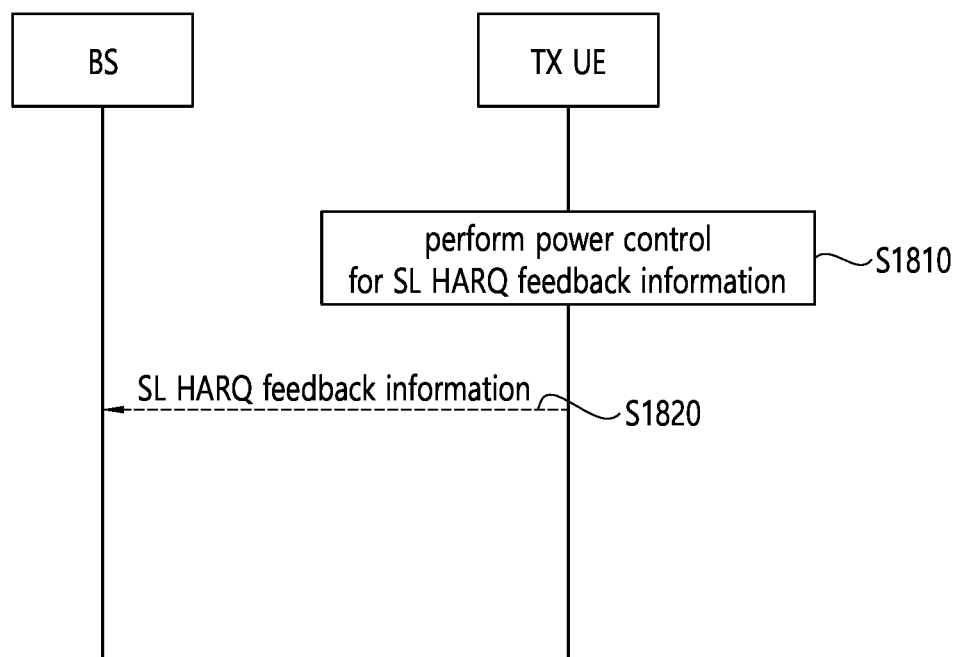
FIG. 18 shows a procedure for a TX UE to report SL HARQ feedback information to a base station, based on an embodiment of the present disclosure.

FIG. 18 shows a procedure for a TX UE to report SL HARQ feedback information to a base station, based on an embodiment of the present disclosure. The embodiment of FIG. 18 may be combined with various embodiments of the present disclosure.

For example, even if the TX UE does not actually transmit sidelink information to the RX UE, the TX UE may report pre-configured SL HARQ feedback information to the base station through a first channel. For example, the TX UE may be a MODE 1 TX UE. For example, the sidelink information may include at least one of a sidelink message, a sidelink packet, a sidelink service, sidelink data, sidelink control information, and/or a sidelink transport block (TB). For example, the first channel may include a PUCCH and/or a PUSCH. For example, even if the TX UE does not actually transmit sidelink information to the RX UE, the TX UE may report pre-configured SL HARQ feedback information to the base station through the first channel. For example, even if the TX UE does not receive SL HARQ feedback information from the RX UE because the TX UE does not actually transmit sidelink information to the RX UE, the TX UE may generate pre-configured SL HARQ feedback information, and the TX UE may report pre-configured SL HARQ feedback information to the base station through the first channel. For example, the pre-configured SL HARQ feedback information may be ACK information. In this case, the base station may not unnecessarily allocate additional resource(s) (e.g., resource(s) allocated by a DG) to the TX UE based on the ACK information. Alternatively, for example, the pre-configured SL HARQ feedback information may be NACK information and/or DTX information.

Referring to FIG. 18, in step S1810, the TX UE may determine a priority of the first channel through which SL HARQ feedback information is transmitted. In addition, for example, the TX UE may perform power control for transmission of the first channel based on the priority. For example, in the case of at least one of CASE A, CASE B and/or CASE C, if transmission and/or reception of a plurality of channels related to messages having the same priority partially or entirely overlap in the time domain, the TX UE may determine or consider transmission or reception of a channel satisfying at least one of the options 1-1 to 1-13 as a relatively high priority.

In this case, for example, the TX UE may determine or consider a priority value of the related sidelink information as a priority value of transmission of the first channel. For example, the TX UE may determine or consider the smallest priority value of the related sidelink information as the priority value of transmission of the first channel. For example, the TX UE may determine or consider the largest priority value of the related sidelink information as the priority value of transmission of the first channel. For example, the TX UE may determine or consider the average value of priority values of the related sidelink information as the priority value of transmission of the first channel.

For example, the TX UE may determine or consider the maximum value, among priority values of a plurality of sidelink information related to a session, as a priority value of transmission of the first channel. For example, the TX UE may determine or consider the minimum value, among priority values of a plurality of sidelink information related to a session, as a priority value of transmission of the first channel. For example, the TX UE may determine or consider the average value of priority values of a plurality of sidelink information related to a session as a priority value of transmission of the first channel. For example, the TX UE may determine or consider the weighted average value of priority values of a plurality of sidelink information related to a session as a priority value of transmission of the first channel. For example, the priority may include a priority related to a service and/or a priority related to QoS.

Figure 19:
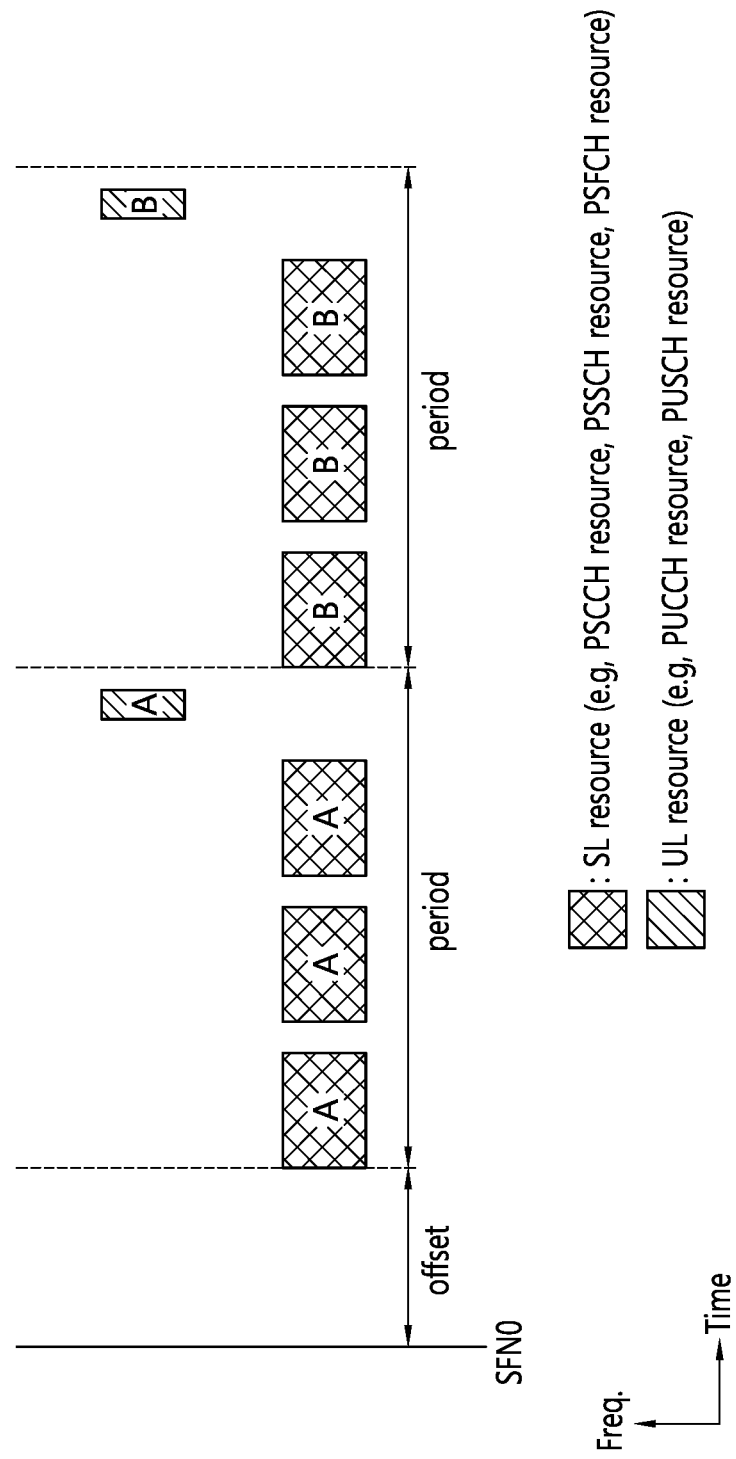
FIG. 19 shows a method for a TX UE to report SL HARQ feedback information to a base station if the TX UE does not perform SL transmission by using resource(s) within a specific period, based on an embodiment of the present disclosure.

FIG. 19 shows a method for a TX UE to report SL HARQ feedback information to a base station if the TX UE does not perform SL transmission by using resource(s) within a specific period, based on an embodiment of the present disclosure. The embodiment of FIG. 19 may be combined with various embodiments of the present disclosure.

Referring to FIG. 19, it is assumed that the TX UE performs SL transmission by using SL resources corresponding to A. In this case, the TX UE may receive SL HARQ feedback information from the RX UE, and the TX UE may report the SL HARQ feedback information to the base station.

On the other hand, it is assumed that the TX UE does not perform SL transmission by using SL resources corresponding to B. For example, the TX UE may not transmit a PSCCH by using SL resources corresponding to B. In this case, the TX UE may generate ACK information, and the TX UE may perform UL transmission (e.g., PUCCH transmission) including ACK information to the base station. Herein, for example, a priority of the UL transmission (e.g., PUCCH transmission) may be the same as the largest priority value among possible priority values for the session. For example, the priority of the UL transmission (e.g., PUCCH transmission) may be the same as the largest priority value among possible priority values for the CG. For example, the TX UE may determine the priority of the ACK information based on Table 9.

TABLE 9

The UE generates an ACK if the UE does not transmit a PSCCH with a SCI format 1-A scheduling a PSSCH in any of the resources provided by a configured grant in a single period and for which the UE is provided a PUCCH resource to report HARQ-ACK information.
The priority value of the ACK is same as the largest priority value among the possible priority values for the configured grant.

For example, the TX UE may determine or consider a pre-configured priority as the priority of transmission of the first channel.

For example, the proposed method can be limitedly applied only if a PUCCH through which SL HARQ feedback information is reported and a PUCCH through which HARQ feedback information for a PSDCH is reported are transmitted based on TDM. For example, the proposed method can be limitedly applied only if SL HARQ feedback information and HARQ feedback information for a PSDCH are not multiplexed in the same PUCCH.

Referring back to FIG. 18, in step S1820, the TX UE may report the SL HARQ feedback information to the base station through the first channel. For example, the TX UE may report the SL HARQ feedback information to the base station through the first channel, by using transmit power allocated for transmission of the first channel.

For example, if the priority related to transmission of the first channel is relatively low compared to other transmission, the TX UE may not transmit the SL HARQ feedback information to the base station. For example, if the priority value related to transmission of the first channel is larger than priority value(s) related to other transmission, the TX UE may not transmit the SL HARQ feedback information to the base station. For example, if the priority related to transmission of the first channel is relatively high compared to other transmission, the TX UE may transmit the SL HARQ feedback information to the base station. For example, if the priority value related to transmission of the first channel is smaller than priority value(s) related to other transmission, the TX UE may transmit the SL HARQ feedback information to the base station.

For example, if the priority related to transmission of the first channel is relatively high compared to other transmission, the TX UE may preferentially allocate transmit power to transmission of the first channel. For example, if the priority related to transmission of the first channel is relatively high compared to other transmission, the TX UE may preferentially perform transmission of the first channel. For example, if the priority value related to transmission of the first channel is smaller than priority value(s) related to other transmission, the TX UE may preferentially allocate transmit power to transmission of the first channel. For example, if the priority value related to transmission of the first channel is smaller than priority value(s) related to other transmission, the TX UE may preferentially perform transmission of the first channel.

Based on an embodiment of the present disclosure, the TX UE may determine or consider a pre-configured priority as a priority of transmission of the first channel. For example, the TX UE may determine or consider a priority pre-configured from the base station or the network as a priority of the transmission of the first channel. For example, the TX UE may receive information related to a priority from the base station or the network. For example, the pre-configured priority for transmission of the first channel may be configured or designated differently from or independently of priorities of other types of PUCCH transmission or PUSCH transmission. For example, a pre-configured priority of PUCCH transmission and/or PUSCH transmission of the type 5 and/or the type 6 may be configured or designated differently from or independently of a priority of PUCCH transmission and/or PUSCH transmission of the type 1 and/or the type 3.

Based on an embodiment of the present disclosure, if the TX UE transmits only SL HARQ feedback information through the first channel, the TX UE may determine a priority related to transmission of the first channel based on procedures related to FIGS. 1 to 19.

For example, if the TX UE transmits SL HARQ feedback information and other information through the first channel, the TX UE may determine or consider a pre-configured priority as a priority related to transmission of the first channel. For example, if the TX UE multiplexes SL HARQ feedback information and other type information (e.g., type 1, type 2 or type 3) and transmits it through one first channel, the TX UE may determine or consider a priority pre-configured from the base station or the network as a priority related to transmission of the first channel.

For example, if the TX UE transmits SL HARQ feedback information and other information through the first channel, the TX UE may apply the procedure related to FIGS. 1 to 19 only for the SL HARQ feedback information, and thus may determine a priority related to transmission of the first channel.

Based on an embodiment of the present disclosure, a priority of a signal related to the type 4 may be pre-configured for the TX UE. For example, the priority of the signal related to the type 4 may be pre-configured for the TX UE from the base station or the network. For example, a priority of a channel related to the type 1 may be pre-configured for the TX UE. For example, the priority of the channel related to the type 1 may be pre-configured for the TX UE from the base station or the network. For example, a priority of a channel related to the type 2 may be pre-configured for the TX UE. For example, the priority of the channel related to the type 2 may be pre-configured for the TX UE from the base station or the network. For example, a priority of a channel related to the type 3 may be pre-configured for the TX UE. For example, the priority of the channel related to the type 3 may be pre-configured for the TX UE from the base station or the network.

Based on an embodiment of the present disclosure, the TX UE may determine or consider a priority of an associated service as a priority of a signal related to the type 4. For example, the TX UE may determine or consider the highest priority among priorities of the associated services as the priority of the signal related to the type 4. For example, the TX UE may determine or consider the lowest priority among priorities of the associated services as the priority of the signal related to the type 4. For example, the TX UE may determine or consider the average priority of priorities of the associated services as the priority of the signal related to the type 4.

Based on an embodiment of the present disclosure, the TX UE may determine or consider a priority of an associated service as a priority of a channel related to the type 1. For example, the TX UE may determine or consider the highest priority among priorities of the associated services as the priority of the channel related to the type 1. For example, the TX UE may determine or consider the lowest priority among priorities of the associated services as the priority of the channel related to the type 1. For example, the TX UE may determine or consider the average priority of priorities of the associated services as the priority of the channel related to the type 1.

Based on an embodiment of the present disclosure, the TX UE may determine or consider a priority of an associated service as a priority of a channel related to the type 2. For example, the TX UE may determine or consider the highest priority among priorities of the associated services as the priority of the channel related to the type 2. For example, the TX UE may determine or consider the lowest priority among priorities of the associated services as the priority of the channel related to the type 2. For example, the TX UE may determine or consider the average priority of priorities of the associated services as the priority of the channel related to the type 2.

Based on an embodiment of the present disclosure, the TX UE may determine or consider a priority of an associated service as a priority of a channel related to the type 3. For example, the TX UE may determine or consider the highest priority among priorities of the associated services as the priority of the channel related to the type 3. For example, the TX UE may determine or consider the lowest priority among priorities of the associated services as the priority of the channel related to the type 3. For example, the TX UE may determine or consider the average priority of priorities of the associated services as the priority of the channel related to the type 3.

Based on various embodiments of the present disclosure, the TX UE may efficiently determine a priority related to transmission of a channel for reporting SL HARQ feedback to the base station. In addition, the TX UE can efficiently perform power control for reporting the SL HARQ feedback to the base station based on the priority.

Figure 20:
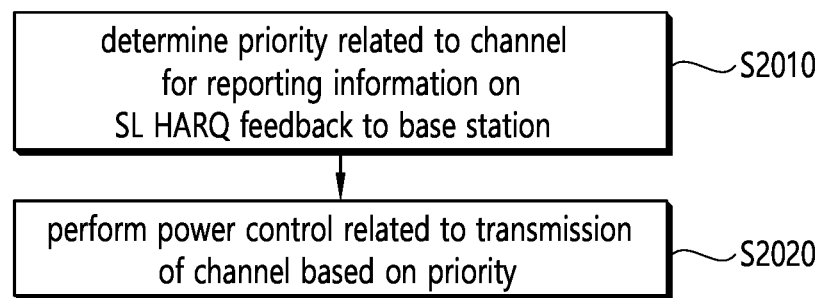
FIG. 20 shows a method for a first device to perform power control related to channel transmission, based on an embodiment of the present disclosure.

FIG. 20 shows a method for a first device to perform power control related to channel transmission, based on an embodiment of the present disclosure. The embodiment of FIG. 20 may be combined with various embodiments of the present disclosure.

Referring to FIG. 20, in step S2010, the first device may determine a priority related to a channel for reporting information on SL HARQ feedback to the base station. For example, in response to sidelink information transmitted by the first device to the second device, the first device may receive information on SL HARQ feedback from the second device. For example, the sidelink information may include at least one of a sidelink message, a sidelink packet, a sidelink service, sidelink data, sidelink control information, and/or a sidelink transport block (TB). For example, the priority related to the channel may be determined based on the priority of the sidelink information. For example, the priority related to the channel may be configured or determined by the base station. For example, the priority related to the channel may be determined based on various embodiments of the present disclosure. For example, the channel may include a PUCCH and/or a PUSCH.

In step S2020, the first device may perform power control related to transmission of the channel based on the priority. For example, the first device may determine or control transmit power of the information on SL HARQ feedback based on the priority. For example, the first device may preferentially transmit the channel based on the priority. For example, the first device may (preferentially) allocate transmit power to transmission of the channel based on the priority and perform transmission of the channel. For example, the first device may not perform transmission of the channel based on the priority.

FIG. 21 shows a method for a base station to receive information on SL HARQ feedback, based on an embodiment of the present disclosure. The embodiment of FIG. 21 may be combined with various embodiments of the present disclosure.

Referring to FIG. 21, in step S2110, the base station may receive information on SL HARQ feedback from the first device through a channel. For example, transmit power of the information on SL HARQ feedback transmitted by the first device through the channel may be determined by the first device based on a priority related to the channel. For example, the priority related to the channel may be determined based on the priority of sidelink information transmitted by the first device. For example, the priority related to the channel may be determined based on the priority of sidelink information to be transmitted by the first device. For example, the priority related to the channel may be configured or determined by the base station. For example, the priority related to the channel may be determined based on various embodiments of the present disclosure. For example, the sidelink information may include at least one of a sidelink message, a sidelink packet, a sidelink service, sidelink data, sidelink control information, and/or a sidelink transport block (TB). For example, the channel may include a PUCCH and/or a PUSCH.

Figure 22:
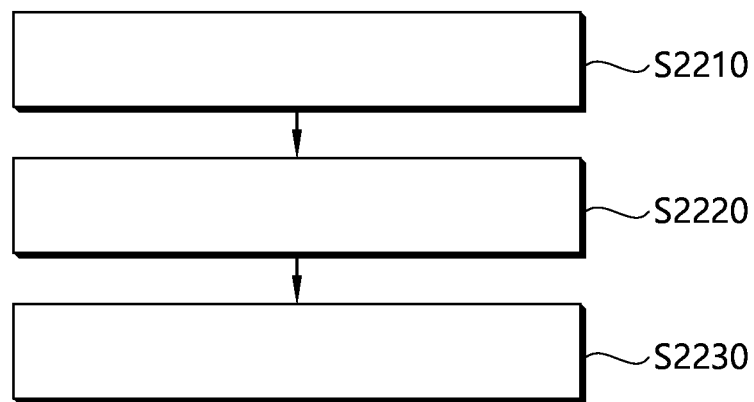
FIG. 22 shows a method for a first device to perform wireless communication, based on an embodiment of the present disclosure.

FIG. 22 shows a method for a first device to perform wireless communication, based on an embodiment of the present disclosure. The embodiment of FIG. 22 may be combined with various embodiments of the present disclosure.

Referring to FIG. 22, in step S2210, the first device may transmit, to a second device, at least one physical sidelink control channel (PSCCH) and at least one physical sidelink shared channel (PSSCH) related to the at least one PSCCH. In step S2220, the first device may receive, from the second device, at least one sidelink (SL) hybrid automatic repeat request (HARQ) feedback information through at least one physical sidelink feedback channel (PSFCH) related to the at least one PSSCH. In step S2230, the first device may determine a priority value of physical uplink control channel (PUCCH) transmission for reporting the at least one SL HARQ feedback information to a base station, based on at least one priority value of the at least one SL HARQ feedback information.

For example, the priority value of the PUCCH transmission may be a smallest value among the at least one priority value of the at least one SL HARQ feedback information. Additionally, for example, the first device may determine the at least one priority value of the at least one SL HARQ feedback information. Herein, for example, the at least one priority value of the at least one SL HARQ feedback information may be a same as at least one priority value related to transmission of the at least one PSSCH. For example, the at least one priority value related to the transmission of the at least one PSSCH may be included in at least one sidelink control information (SCI) transmitted through the at least one PSCCH.

Additionally, for example, the first device may perform the PUCCH transmission or SL transmission based on the priority value of the PUCCH transmission and a priority value of the SL transmission. For example, the PUCCH transmission and the SL transmission may overlap in a time domain. For example, based on the priority value of the PUCCH transmission being smaller than the priority value of the SL transmission, the PUCCH transmission may be performed to the base station. For example, based on (i) the priority value of the PUCCH transmission being smaller than the priority value of the SL transmission and (ii) a sum of power related to the PUCCH transmission and power related to the SL transmission exceeding maximum transmit power of the first device, the power related to the SL transmission may be reduced such that the sum does not exceed the maximum transmit power. For example, based on the priority value of the PUCCH transmission being larger than the priority value of the SL transmission, the SL transmission may be performed. For example, based on (i) the priority value of the PUCCH transmission being larger than the priority value of the SL transmission, and (ii) a sum of power related to the PUCCH transmission and power related to the SL transmission exceeding maximum transmit power of the first device, the power related to the PUCCH transmission may be reduced such that the sum does not exceed the maximum transmit power.

Additionally, for example, the first device may transmit a physical random access channel (PRACH) to the base station. For example, a priority related to transmission of the PRACH may be higher than a priority related to transmission of a PSFCH. For example, a priority related to transmission of the PRACH may be higher than a priority related to transmission of a sidelink-synchronization signal block (S-SSB).

Additionally, for example, the first device may receive information related to a SL resource from the base station.

The proposed method can be applied to the device(s) described in the present disclosure. First, the processor 102 of the first device 100 may control the transceiver 106 to transmit, to a second device, at least one physical sidelink control channel (PSCCH) and at least one physical sidelink shared channel (PSSCH) related to the at least one PSCCH. In addition, the processor 102 of the first device 100 may control the transceiver 106 to receive, from the second device, at least one sidelink (SL) hybrid automatic repeat request (HARQ) feedback information through at least one physical sidelink feedback channel (PSFCH) related to the at least one PSSCH. In addition, the processor 102 of the first device 100 may determine a priority value of physical uplink control channel (PUCCH) transmission for reporting the at least one SL HARQ feedback information to a base station, based on at least one priority value of the at least one SL HARQ feedback information.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: transmit, to a second device, at least one physical sidelink control channel (PSCCH) and at least one physical sidelink shared channel (PSSCH) related to the at least one PSCCH; receive, from the second device, at least one sidelink (SL) hybrid automatic repeat request (HARQ) feedback information through at least one physical sidelink feedback channel (PSFCH) related to the at least one PSSCH; and determine a priority value of physical uplink control channel (PUCCH) transmission for reporting the at least one SL HARQ feedback information to a base station, based on at least one priority value of the at least one SL HARQ feedback information.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: transmit, to a second UE, at least one physical sidelink control channel (PSCCH) and at least one physical sidelink shared channel (PSSCH) related to the at least one PSCCH; receive, from the second UE, at least one sidelink (SL) hybrid automatic repeat request (HARQ) feedback information through at least one physical sidelink feedback channel (PSFCH) related to the at least one PSSCH; and determine a priority value of physical uplink control channel (PUCCH) transmission for reporting the at least one SL HARQ feedback information to a base station, based on at least one priority value of the at least one SL HARQ feedback information.

Based on an embodiment of the present disclosure, a non-transitory computer-readable storage medium storing instructions may be provided. For example, the instructions, when executed, may cause a first device to: transmit, to a second device, at least one physical sidelink control channel (PSCCH) and at least one physical sidelink shared channel (PSSCH) related to the at least one PSCCH; receive, from the second device, at least one sidelink (SL) hybrid automatic repeat request (HARQ) feedback information through at least one physical sidelink feedback channel (PSFCH) related to the at least one PSSCH; and determine a priority value of physical uplink control channel (PUCCH) transmission for reporting the at least one SL HARQ feedback information to a base station, based on at least one priority value of the at least one SL HARQ feedback information.

Figure 23:
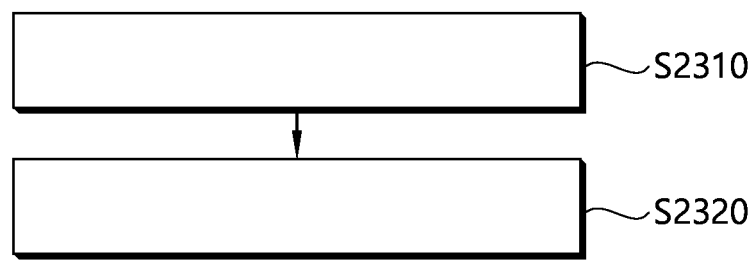
FIG. 23 shows a method for a base station to perform wireless communication, based on an embodiment of the present disclosure.

FIG. 23 shows a method for a base station to perform wireless communication, based on an embodiment of the present disclosure. The embodiment of FIG. 23 may be combined with various embodiments of the present disclosure.

Referring to FIG. 23, in step S2310, the base station may transmit, to a first device, information related to a sidelink (SL) resource and information related to a physical uplink control channel (PUCCH) resource. In step S2320, the base station may receive, from the first device, at least one SL hybrid automatic repeat request (HARQ) feedback information based on the PUCCH resource. For example, a priority value of PUCCH transmission by the first device may be a smallest value among priority values of the at least one SL HARQ feedback information.

The proposed method can be applied to the device(s) described in the present disclosure. First, the processor 202 of the base station 200 may control the transceiver 206 to transmit, to a first device, information related to a sidelink (SL) resource and information related to a physical uplink control channel (PUCCH) resource. In addition, the processor 202 of the base station 200 may control the transceiver 206 to receive, from the first device, at least one SL hybrid automatic repeat request (HARQ) feedback information based on the PUCCH resource. For example, a priority value of PUCCH transmission by the first device may be a smallest value among priority values of the at least one SL HARQ feedback information.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, information related to a sidelink (SL) resource and information related to a physical uplink control channel (PUCCH) resource; and receive, from the first device, at least one SL hybrid automatic repeat request (HARQ) feedback information based on the PUCCH resource. For example, a priority value of PUCCH transmission by the first device may be a smallest value among priority values of the at least one SL HARQ feedback information.

Based on an embodiment of the present disclosure, an apparatus configured to control a base station performing wireless communication may be provided. For example, the apparatus may comprise: one or more processors; and one or more memories operably connected to the one or more processors and storing instructions. For example, the one or more processors may execute the instructions to: transmit, to a first user equipment (UE), information related to a sidelink (SL) resource and information related to a physical uplink control channel (PUCCH) resource; and receive, from the first UE, at least one SL hybrid automatic repeat request (HARQ) feedback information based on the PUCCH resource. For example, a priority value of PUCCH transmission by the first UE may be a smallest value among priority values of the at least one SL HARQ feedback information.

Based on an embodiment of the present disclosure, a non-transitory computer-readable storage medium storing instructions may be provided. For example, the instructions, when executed, may cause a base station to: transmit, to a first device, information related to a sidelink (SL) resource and information related to a physical uplink control channel (PUCCH) resource; and receive, from the first device, at least one SL hybrid automatic repeat request (HARQ) feedback information based on the PUCCH resource. For example, a priority value of PUCCH transmission by the first device may be a smallest value among priority values of the at least one SL HARQ feedback information.

Figure 24:
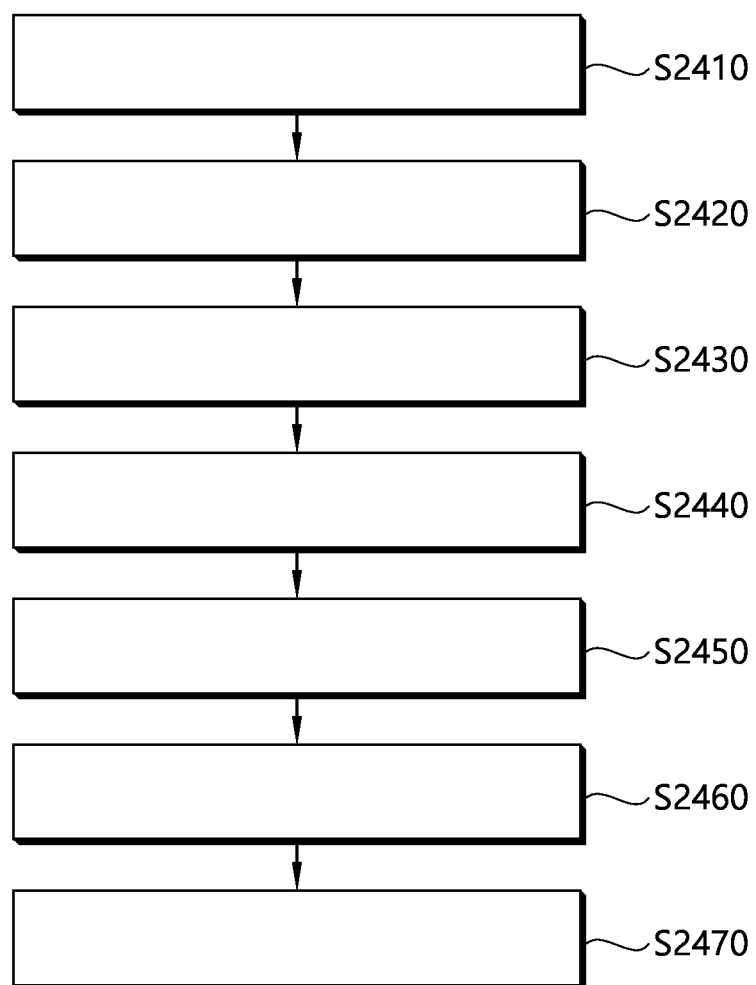
FIG. 24 shows a method for a first device to perform wireless communication, based on an embodiment of the present disclosure.

FIG. 24 shows a method for a first device to perform wireless communication, based on an embodiment of the present disclosure. The embodiment of FIG. 24 may be combined with various embodiments of the present disclosure.

Referring to FIG. 24, in step S2410, the first device may select a synchronization reference based on a sidelink (SL)

synchronization priority. For example, the SL synchronization priority may be set to a global navigation satellite system (GNSS)-based synchronization or a base station (BS)-based synchronization, and the synchronization reference may include at least one of a GNSS, a base station, or a UE, and based on the SL synchronization priority being set to the GNSS-based synchronization, a priority of a synchronization reference related to the GNSS may be higher than a priority of a synchronization reference related to the base station, and based on the SL synchronization priority being set to the BS-based synchronization, the priority of the synchronization reference related to the base station may be higher than the priority of the synchronization reference related to the GNSS. In step S2420, the first device may obtain synchronization based on the synchronization reference. In step S2430, the first device may transmit, to a second device, a first physical sidelink control channel (PSCCH) and a first physical sidelink shared channel (PSSCH) related to the first PSCCH. In step S2440, the first device may transmit, to the second device, a second PSCCH and a second PSSCH related to the second PSCCH. In step S2450, the first device may receive, from the second device, first SL hybrid automatic repeat request (HARQ) feedback information through a first physical sidelink feedback channel (PSFCH) related to the first PSSCH. In step S2460, the first device may receive, from the second device, second SL HARQ feedback information through a second PSFCH related to the second PSSCH. In step S2470, the first device may determine a priority value of physical uplink control channel (PUCCH) transmission for reporting the first SL HARQ feedback information and the second SL HARQ feedback information to a base station, based on a priority value of the first SL HARQ feedback information and a priority value of the second SL HARQ feedback information.

For example, the priority value of the PUCCH transmission may be a smallest value among the priority value of the first SL HARQ feedback information and the priority value of the second SL HARQ feedback information. Additionally, for example, the first device may determine the priority value of the first SL HARQ feedback information and the priority value of the second SL HARQ feedback information. For example, the priority value of the first SL HARQ feedback information may be a same as a priority value related to transmission of the first PSSCH, and the priority value of the second SL HARQ feedback information may be a same as a priority value related to transmission of the second PSSCH. For example, the priority value related to the transmission of the first PSSCH may be transmitted through a sidelink control information (SCI) on the first PSCCH, and the priority value related to the transmission of the second PSSCH may be transmitted through a SCI on the second PSCCH.

Additionally, for example, the first device may receive information related to SL resource allocation from the base station.

Additionally, for example, the first device may perform physical random access channel (PRACH) transmission to the base station. For example, a priority of the PRACH transmission may be higher than a priority of PSFCH transmission. For example, a priority of the PRACH transmission may be higher than a priority of sidelink-synchronization signal block (S-SSB) transmission.

Additionally, for example, the first device may perform the PUCCH transmission or SL transmission based on the priority value of the PUCCH transmission and a priority value of the SL transmission. For example, the PUCCH transmission and the SL transmission may overlap in a time domain. For example, the priority value of the PUCCH transmission may be smaller than the priority value of the SL transmission, and the PUCCH transmission may be performed to the base station, and the SL transmission may not be performed. For example, the priority value of the PUCCH transmission may be smaller than the priority value of the SL transmission, and a sum of power for the PUCCH transmission and power for the SL transmission may exceed maximum transmit power of the first device, and the power for the SL transmission may be reduced such that the sum does not exceed the maximum transmit power. For example, the priority value of the PUCCH transmission may be larger than the priority value of the SL transmission, and the SL transmission may be performed, and the PUCCH transmission may not be performed to the base station. For example, the priority value of the PUCCH transmission may be larger than the priority value of the SL transmission, and a sum of power for the PUCCH transmission and power for the SL transmission may exceed maximum transmit power of the first device, and the power for the PUCCH transmission may be reduced such that the sum does not exceed the maximum transmit power.

The proposed method can be applied to the device(s) described in the present disclosure. First, the processor 102 of the first device 100 may select a synchronization reference based on a sidelink (SL) synchronization priority. For example, the SL synchronization priority may be set to a global navigation satellite system (GNSS)-based synchronization or a base station (BS)-based synchronization, and the synchronization reference may include at least one of a GNSS, a base station, or a UE, and based on the SL synchronization priority being set to the GNSS-based synchronization, a priority of a synchronization reference related to the GNSS may be higher than a priority of a synchronization reference related to the base station, and based on the SL synchronization priority being set to the BS-based synchronization, the priority of the synchronization reference related to the base station may be higher than the priority of the synchronization reference related to the GNSS. In addition, the processor 102 of the first device 100 may obtain synchronization based on the synchronization reference. In addition, the processor 102 of the first device 100 may control the transceiver 106 to transmit, to a second device, a first physical sidelink control channel (PSCCH) and a first physical sidelink shared channel (PSSCH) related to the first PSCCH. In addition, the processor 102 of the first device 100 may control the transceiver 106 to transmit, to the second device, a second PSCCH and a second PSSCH related to the second PSCCH. In addition, the processor 102 of the first device 100 may control the transceiver 106 to receive, from the second device, first SL hybrid automatic repeat request (HARQ) feedback information through a first physical sidelink feedback channel (PSFCH) related to the first PSSCH. In addition, the processor 102 of the first device 100 may control the transceiver 106 to receive, from the second device, second SL HARQ feedback information through a second PSFCH related to the second PSSCH. In addition, the processor 102 of the first device 100 may determine a priority value of physical uplink control channel (PUCCH) transmission for reporting the first SL HARQ feedback information and the second SL HARQ feedback information to a base station, based on a priority value of the first SL HARQ feedback information and a priority value of the second SL HARQ feedback information.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: select a synchronization reference based on a sidelink (SL) synchronization priority, wherein the SL synchronization priority is set to a global navigation satellite system (GNSS)-based synchronization or a base station (BS)-based synchronization, wherein the synchronization reference includes at least one of a GNSS, abase station, or a UE, wherein, based on the SL synchronization priority being set to the GNSS-based synchronization, a priority of a synchronization reference related to the GNSS is higher than a priority of a synchronization reference related to the base station, and wherein, based on the SL synchronization priority being set to the BS-based synchronization, the priority of the synchronization reference related to the base station is higher than the priority of the synchronization reference related to the GNSS; obtain synchronization based on the synchronization reference; transmit, to a second device, a first physical sidelink control channel (PSCCH) and a first physical sidelink shared channel (PSSCH) related to the first PSCCH; transmit, to the second device, a second PSCCH and a second PSSCH related to the second PSCCH; receive, from the second device, first SL hybrid automatic repeat request (HARQ) feedback information through a first physical sidelink feedback channel (PSFCH) related to the first PSSCH; receive, from the second device, second SL HARQ feedback information through a second PSFCH related to the second PSSCH; and based on a priority value of the first SL HARQ feedback information and a priority value of the second SL HARQ feedback information, determine a priority value of physical uplink control channel (PUCCH) transmission for reporting the first SL HARQ feedback information and the second SL HARQ feedback information to a base station.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: select a synchronization reference based on a sidelink (SL) synchronization priority, wherein the SL synchronization priority is set to a global navigation satellite system (GNSS)-based synchronization or a base station (BS)-based synchronization, wherein the synchronization reference includes at least one of a GNSS, a base station, or a UE, wherein, based on the SL synchronization priority being set to the GNSS-based synchronization, a priority of a synchronization reference related to the GNSS is higher than a priority of a synchronization reference related to the base station, and wherein, based on the SL synchronization priority being set to the BS-based synchronization, the priority of the synchronization reference related to the base station is higher than the priority of the synchronization reference related to the GNSS; obtain synchronization based on the synchronization reference; transmit, to a second UE, a first physical sidelink control channel (PSCCH) and a first physical sidelink shared channel (PSSCH) related to the first PSCCH; transmit, to the second UE, a second PSCCH and a second PSSCH related to the second PSCCH; receive, from the second UE, first SL hybrid automatic repeat request (HARQ) feedback information through a first physical sidelink feedback channel (PSFCH) related to the first PSSCH; receive, from the second UE, second SL HARQ feedback information through a second PSFCH related to the second PSSCH; and based on a priority value of the first SL HARQ feedback information and a priority value of the second SL HARQ feedback information, determine a priority value of physical uplink control channel (PUCCH) transmission for reporting the first SL HARQ feedback information and the second SL HARQ feedback information to a base station.

Based on an embodiment of the present disclosure, a non-transitory computer-readable storage medium storing instructions may be provided. For example, the instructions, when executed, may cause a first device to: select a synchronization reference based on a sidelink (SL) synchronization priority, wherein the SL synchronization priority is set to a global navigation satellite system (GNSS)-based synchronization or a base station (BS)-based synchronization, wherein the synchronization reference includes at least one of a GNSS, a base station, or a UE, wherein, based on the SL synchronization priority being set to the GNSS-based synchronization, a priority of a synchronization reference related to the GNSS is higher than a priority of a synchronization reference related to the base station, and wherein, based on the SL synchronization priority being set to the BS-based synchronization, the priority of the synchronization reference related to the base station is higher than the priority of the synchronization reference related to the GNSS; obtain synchronization based on the synchronization reference; transmit, to a second device, a first physical sidelink control channel (PSCCH) and a first physical sidelink shared channel (PSSCH) related to the first PSCCH; transmit, to the second device, a second PSCCH and a second PSSCH related to the second PSCCH; receive, from the second device, first SL hybrid automatic repeat request (HARQ) feedback information through a first physical sidelink feedback channel (PSFCH) related to the first PSSCH; receive, from the second device, second SL HARQ feedback information through a second PSFCH related to the second PSSCH; and based on a priority value of the first SL HARQ feedback information and a priority value of the second SL HARQ feedback information, determine a priority value of physical uplink control channel (PUCCH) transmission for reporting the first SL HARQ feedback information and the second SL HARQ feedback information to a base station.

Figure 25:
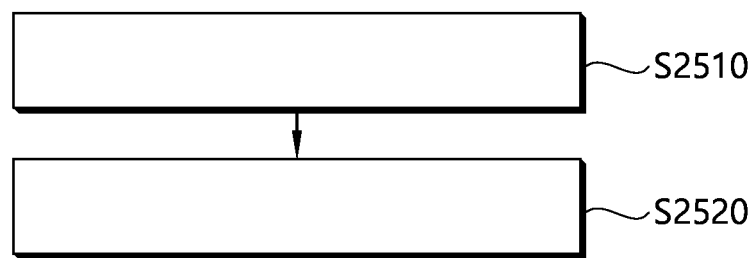
FIG. 25 shows a method for a base station to perform wireless communication, based on an embodiment of the present disclosure.

FIG. 25 shows a method for a base station to perform wireless communication, based on an embodiment of the present disclosure. The embodiment of FIG. 25 may be combined with various embodiments of the present disclosure.

Referring to FIG. 25, in step S2510, the base station may transmit, to a first device through a downlink (DL) bandwidth part (BWP), information related to a sidelink (SL) resource and information related to a physical uplink control channel (PUCCH) resource. In step S2520, the base station may receive, from the first device through the PUCCH resource on an uplink (UL) BWP, first SL hybrid automatic repeat request (HARQ) feedback information and second SL HARQ feedback information. For example, a priority value of PUCCH transmission by the first device may be a smallest value among a priority value of the first SL HARQ feedback information and a priority value of the second SL HARQ feedback information.

The proposed method can be applied to the device(s) described in the present disclosure. First, the processor 202 of the base station 200 may control the transceiver 206 to transmit, to a first device through a downlink (DL) bandwidth part (BWP), information related to a sidelink (SL) resource and information related to a physical uplink control channel (PUCCH) resource. In addition, the processor 202 of the base station 200 may control the transceiver 206 to receive, from the first device through the PUCCH resource on an uplink (UL) BWP, first SL hybrid automatic repeat request (HARQ) feedback information and second SL HARQ feedback information. For example, a priority value of PUCCH transmission by the first device may be a smallest value among a priority value of the first SL HARQ feedback information and a priority value of the second SL HARQ feedback information.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device through a downlink (DL) bandwidth part (BWP), information related to a sidelink (SL) resource and information related to a physical uplink control channel (PUCCH) resource; and receive, from the first device through the PUCCH resource on an uplink (UL) BWP, first SL hybrid automatic repeat request (HARQ) feedback information and second SL HARQ feedback information. For example, a priority value of PUCCH transmission by the first device may be a smallest value among a priority value of the first SL HARQ feedback information and a priority value of the second SL HARQ feedback information.

Based on an embodiment of the present disclosure, an apparatus configured to control a base station performing wireless communication may be provided. For example, the apparatus may comprise: one or more processors; and one or more memories operably connected to the one or more processors and storing instructions. For example, the one or more processors may execute the instructions to: transmit, to a first user equipment (UE) through a downlink (DL) bandwidth part (BWP), information related to a sidelink (SL) resource and information related to a physical uplink control channel (PUCCH) resource; and receive, from the first UE through the PUCCH resource on an uplink (UL) BWP, first SL hybrid automatic repeat request (HARQ) feedback information and second SL HARQ feedback information. For example, a priority value of PUCCH transmission by the first UE may be a smallest value among a priority value of the first SL HARQ feedback information and a priority value of the second SL HARQ feedback information.

Based on an embodiment of the present disclosure, a non-transitory computer-readable storage medium storing instructions may be provided. For example, the instructions, when executed, may cause a base station to: transmit, to a first device through a downlink (DL) bandwidth part (BWP), information related to a sidelink (SL) resource and information related to a physical uplink control channel (PUCCH) resource; and receive, from the first device through the PUCCH resource on an uplink (UL) BWP, first SL hybrid automatic repeat request (HARQ) feedback information and second SL HARQ feedback information. For example, a priority value of PUCCH transmission by the first device may be a smallest value among a priority value of the first SL HARQ feedback information and a priority value of the second SL HARQ feedback information.

Figure 26:
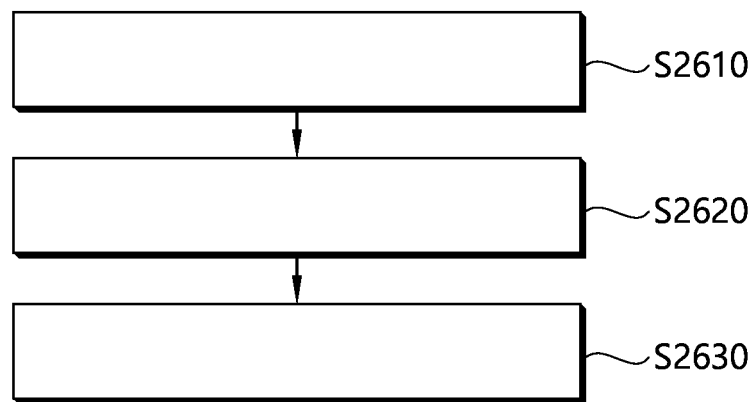
FIG. 26 shows a method for a first device to perform wireless communication, based on an embodiment of the present disclosure.

FIG. 26 shows a method for a first device to perform wireless communication, based on an embodiment of the present disclosure. The embodiment of FIG. 26 may be combined with various embodiments of the present disclosure.

Referring to FIG. 26, in step S2610, the first device may receive, from a base station, information related to a physical uplink control channel (PUCCH) resource for reporting hybrid automatic repeat request (HARQ) feedback information and information related to a first sidelink (SL) resource. In step S2620, the first device may generate the HARQ feedback information based on first SL transmission being not performed on the first SL resource by the first device. In step S2630, the first device may determine a priority value of the HARQ feedback information. For example, the priority value of the HARQ feedback information may be a same as a largest priority value among at least one priority value related to the first SL resource.

Additionally, for example, the first device may determine not to perform the first SL transmission on the first SL resource. For example, the HARQ feedback information generated by the first device, based on the first SL transmission being not performed on the first SL resource by the first device, may be ACK. For example, the first SL transmission may include physical sidelink control channel (PSCCH) transmission or physical sidelink shared channel (PSSCH) transmission. For example, the first SL resource may be a resource allocated by a configured grant. For example, the first SL resource may be allocated periodically by the configured grant, and based on the first device not performing the first SL transmission on the first SL resource within a first period allocated by the configured grant, the ACK may be generated by the first device.

Additionally, for example, the first device may perform at least one of second SL transmission based on a second SL resource or PUCCH transmission including the HARQ feedback information based on the PUCCH resource, based on the priority value of the HARQ feedback information and a priority value of the second SL transmission. For example, the PUCCH resource and the second SL resource may overlap in a time domain. For example, based on the priority value of the HARQ feedback information being smaller than the priority value of the second SL transmission, the PUCCH transmission including the HARQ feedback information may be performed. For example, based on the priority value of the HARQ feedback information being larger than the priority value of the second SL transmission, the second SL transmission may be performed. For example, based on (i) the priority value of the HARQ feedback information being smaller than the priority value of the second SL transmission and (ii) sum of power related to the PUCCH transmission and power related to the second SL transmission exceeding maximum transmit power of the first device, the power related to the second SL transmission may be reduced such that the sum does not exceed the maximum transmit power. For example, based on (i) the priority value of the HARQ feedback information being larger than the priority value of the second SL transmission and (ii) sum of power related to the PUCCH transmission and power related to the second SL transmission exceeding maximum transmit power of the first device, the power related to the PUCCH transmission may be reduced such that the sum does not exceed the maximum transmit power.

Additionally, for example, the first device may perform physical random access channel (PRACH) transmission to the base station. For example, a priority related to the PRACH transmission may be higher than a priority related to PSFCH transmission or a priority related to sidelink-synchronization signal block (S-SSB) transmission.

For example, the at least one priority value related to the first SL resource may be at least one possible priority value for a configured grant related to the first SL resource.

The proposed method can be applied to the device(s) described in the present disclosure. First, the processor 102 of the first device 100 may control the transceiver 106 to receive, from a base station, information related to a physical uplink control channel (PUCCH) resource for reporting hybrid automatic repeat request (HARQ) feedback information and information related to a first sidelink (SL) resource. In addition, the processor 102 of the first device 100 may generate the HARQ feedback information based on first SL transmission being not performed on the first SL resource by the first device. In addition, the processor 102 of the first device 100 may determine a priority value of the HARQ feedback information. For example, the priority value of the HARQ feedback information may be a same as a largest priority value among at least one priority value related to the first SL resource.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, information related to a physical uplink control channel (PUCCH) resource for reporting hybrid automatic repeat request (HARQ) feedback information and information related to a first sidelink (SL) resource; generate the HARQ feedback information based on first SL transmission being not performed on the first SL resource by the first device; and determine a priority value of the HARQ feedback information. For example, the priority value of the HARQ feedback information may be a same as a largest priority value among at least one priority value related to the first SL resource.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a base station, information related to a physical uplink control channel (PUCCH) resource for reporting hybrid automatic repeat request (HARQ) feedback information and information related to a first sidelink (SL) resource; generate the HARQ feedback information based on first SL transmission being not performed on the first SL resource by the first UE; and determine a priority value of the HARQ feedback information. For example, the priority value of the HARQ feedback information may be a same as a largest priority value among at least one priority value related to the first SL resource.

Based on an embodiment of the present disclosure, a non-transitory computer-readable storage medium storing instructions may be provided. For example, the instructions, when executed, may cause a first device to: receive, from a base station, information related to a physical uplink control channel (PUCCH) resource for reporting hybrid automatic repeat request (HARQ) feedback information and information related to a first sidelink (SL) resource; generate the HARQ feedback information based on first SL transmission being not performed on the first SL resource by the first device; and determine a priority value of the HARQ feedback information. For example, the priority value of the HARQ feedback information may be a same as a largest priority value among at least one priority value related to the first SL resource.

Figure 27:
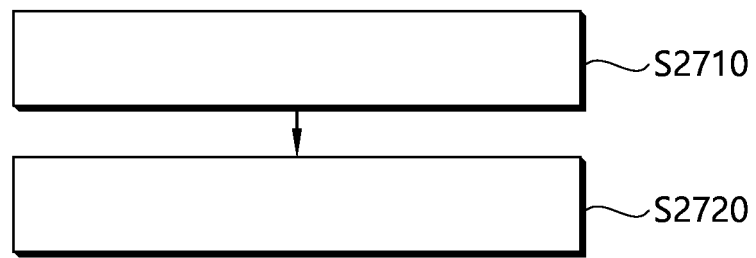
FIG. 27 shows a method for a base station to perform wireless communication, based on an embodiment of the present disclosure.

FIG. 27 shows a method for a base station to perform wireless communication, based on an embodiment of the present disclosure. The embodiment of FIG. 27 may be combined with various embodiments of the present disclosure.

Referring to FIG. 27, in step S2710, the base station may transmit, to a first device, information related to a physical uplink control channel (PUCCH) resource and information related to a first sidelink (SL) resource for reporting hybrid automatic repeat request (HARQ) feedback information. In step S2720, the base station may receive, from the first device through the PUCCH resource, the HARQ feedback information based on first SL transmission being not performed on the first SL resource by the first device. For example, a priority value of the HARQ feedback information may be a same as a largest priority value among at least one priority value related to the first SL resource.

The proposed method can be applied to the device(s) described in the present disclosure. First, the processor 202 of the base station 200 may control the transceiver 206 to transmit, to a first device, information related to a physical uplink control channel (PUCCH) resource and information related to a first sidelink (SL) resource for reporting hybrid automatic repeat request (HARQ) feedback information. In addition, the processor 202 of the base station 200 may control the transceiver 206 to receive, from the first device through the PUCCH resource, the HARQ feedback information based on first SL transmission being not performed on the first SL resource by the first device. For example, a priority value of the HARQ feedback information may be a same as a largest priority value among at least one priority value related to the first SL resource.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, information related to a physical uplink control channel (PUCCH) resource and information related to a first sidelink (SL) resource for reporting hybrid automatic repeat request (HARQ) feedback information; and receive, from the first device through the PUCCH resource, the HARQ feedback information based on first SL transmission being not performed on the first SL resource by the first device. For example, a priority value of the HARQ feedback information may be a same as a largest priority value among at least one priority value related to the first SL resource.

Based on an embodiment of the present disclosure, an apparatus configured to control a base station performing wireless communication may be provided. For example, the apparatus may comprise: one or more processors; and one or more memories operably connected to the one or more processors and storing instructions. For example, the one or more processors may execute the instructions to: transmit, to a first user equipment (UE), information related to a physical uplink control channel (PUCCH) resource and information related to a first sidelink (SL) resource for reporting hybrid automatic repeat request (HARQ) feedback information; and receive, from the first UE through the PUCCH resource, the HARQ feedback information based on first SL transmission being not performed on the first SL resource by the first UE. For example, a priority value of the HARQ feedback information may be a same as a largest priority value among at least one priority value related to the first SL resource.

Based on an embodiment of the present disclosure, a non-transitory computer-readable storage medium storing instructions may be provided. For example, the instructions, when executed, may cause a base station to: transmit, to a first device, information related to a physical uplink control channel (PUCCH) resource and information related to a first sidelink (SL) resource for reporting hybrid automatic repeat request (HARQ) feedback information; and receive, from the first device through the PUCCH resource, the HARQ feedback information based on first SL transmission being not performed on the first SL resource by the first device. For example, a priority value of the HARQ feedback information may be a same as a largest priority value among at least one priority value related to the first SL resource.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 28:
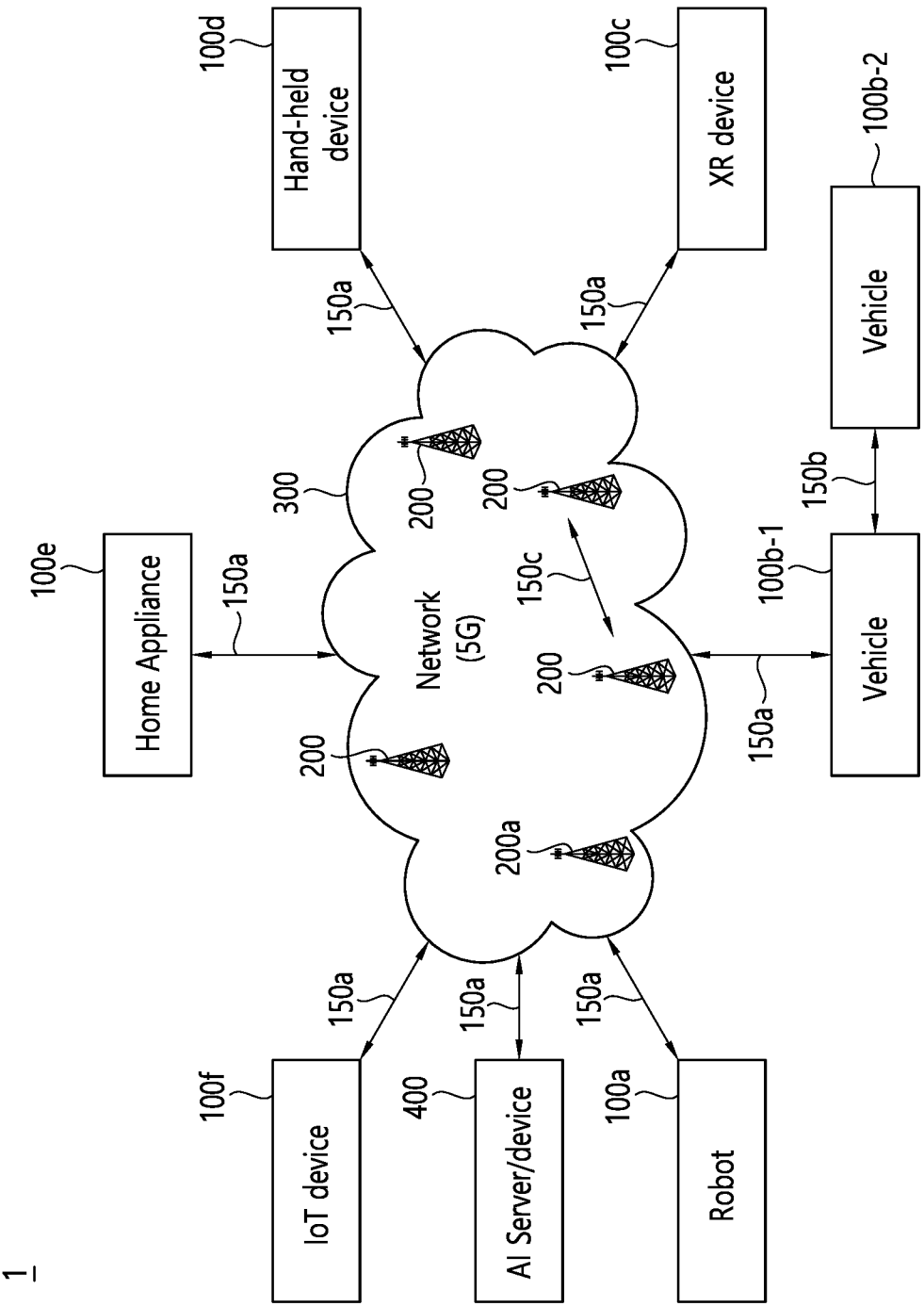
FIG. 28 shows a communication system 1, based on an embodiment of the present disclosure.

FIG. 28 shows a communication system 1, based on an embodiment of the present disclosure.

Referring to FIG. 28, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (JAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 29:
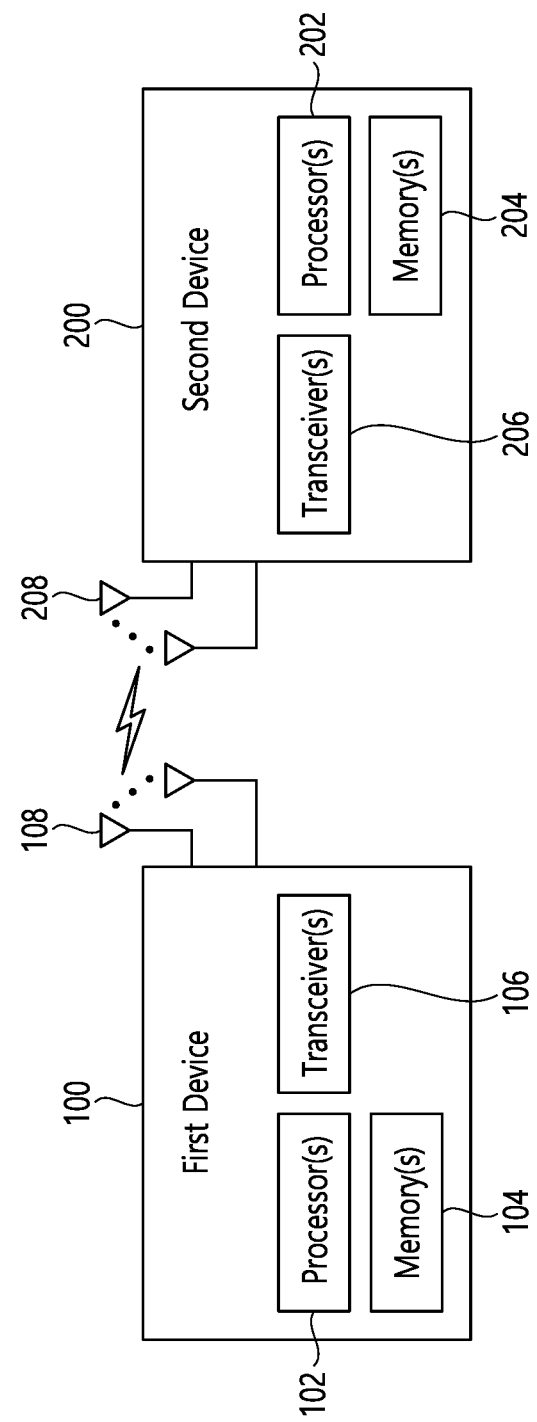
FIG. 29 shows wireless devices, based on an embodiment of the present disclosure.

FIG. 29 shows wireless devices, based on an embodiment of the present disclosure.

Referring to FIG. 29, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 28.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 30:
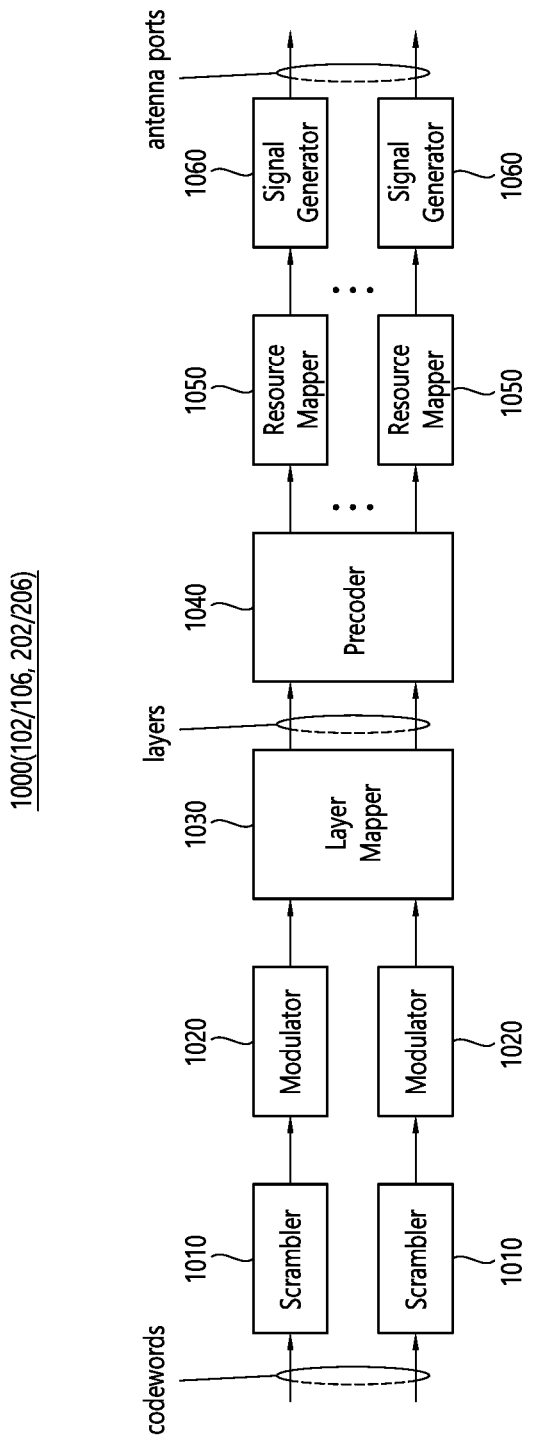
FIG. 30 shows a signal process circuit for a transmission signal, based on an embodiment of the present disclosure.

FIG. 30 shows a signal process circuit for a transmission signal, based on an embodiment of the present disclosure.

Referring to FIG. 30, a signal processing circuit 1000 may include scramblers 1010, modulators 1020, a layer mapper 1030, a precoder 1040, resource mappers 1050, and signal generators 1060. An operation/function of FIG. 30 may be performed, without being limited to, the processors 102 and 202 and/or the transceivers 106 and 206 of FIG. 29. Hardware elements of FIG. 30 may be implemented by the processors 102 and 202 and/or the transceivers 106 and 206 of FIG. 29. For example, blocks 1010 to 1060 may be implemented by the processors 102 and 202 of FIG. 29. Alternatively, the blocks 1010 to 1050 may be implemented by the processors 102 and 202 of FIG. 29 and the block 1060 may be implemented by the transceivers 106 and 206 of FIG. 29.

Codewords may be converted into radio signals via the signal processing circuit 1000 of FIG. 30. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 30. For example, the wireless devices (e.g., 100 and 200 of FIG. 29) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 31:
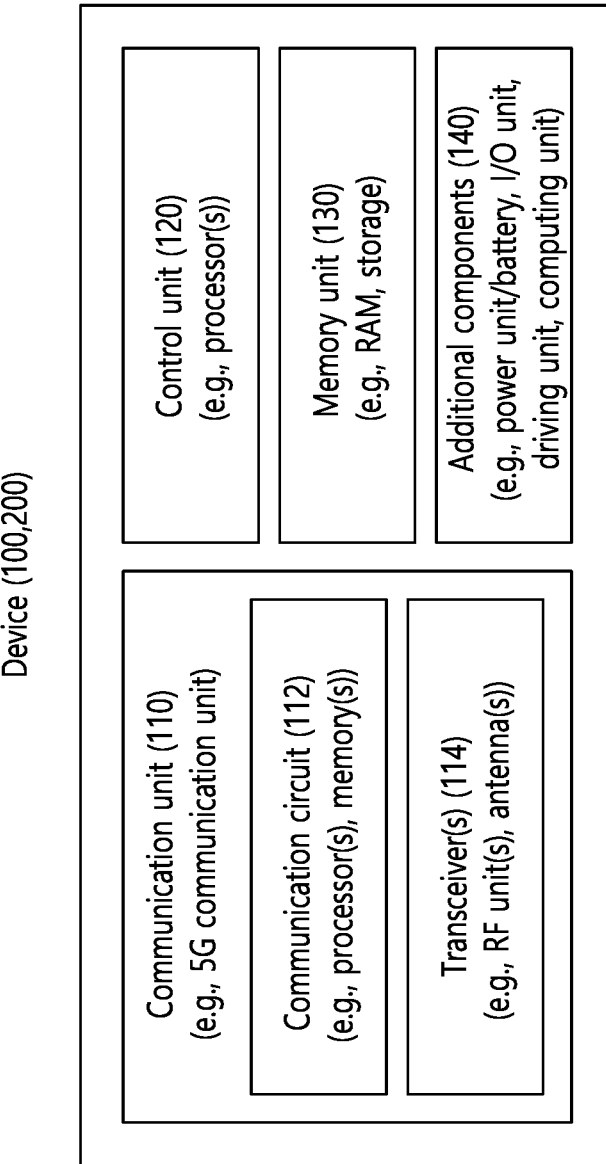
FIG. 31 shows another example of a wireless device, based on an embodiment of the present disclosure.

FIG. 31 shows another example of a wireless device, based on an embodiment of the present disclosure. The wireless device may be implemented in various forms according to a use-case/service (refer to FIG. 28).

Referring to FIG. 31, wireless devices 100 and 200 may correspond to the wireless devices 100 and 200 of FIG. 29 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 29. For example, the transceiver(s) 114 may include the one or more transceivers 106 and 206 and/or the one or more antennas 108 and 208 of FIG. 29. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 28), the vehicles (100b-1 and 100b-2 of FIG. 28), the XR device (100c of FIG. 28), the hand-held device (100d of FIG. 28), the home appliance (100e of FIG. 28), the IoT device (100f of FIG. 28), a digital broadcast terminal, a hologram device, a public safety device, an MTC device, a medicine device, a fintech device (or a finance device), a security device, a climate/environment device, the AI server/device (400 of FIG. 28), the BSs (200 of FIG. 28), a network node, etc. The wireless device may be used in a mobile or fixed place according to a use-example/service.

In FIG. 31, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 31 will be described in detail with reference to the drawings.

Figure 32:
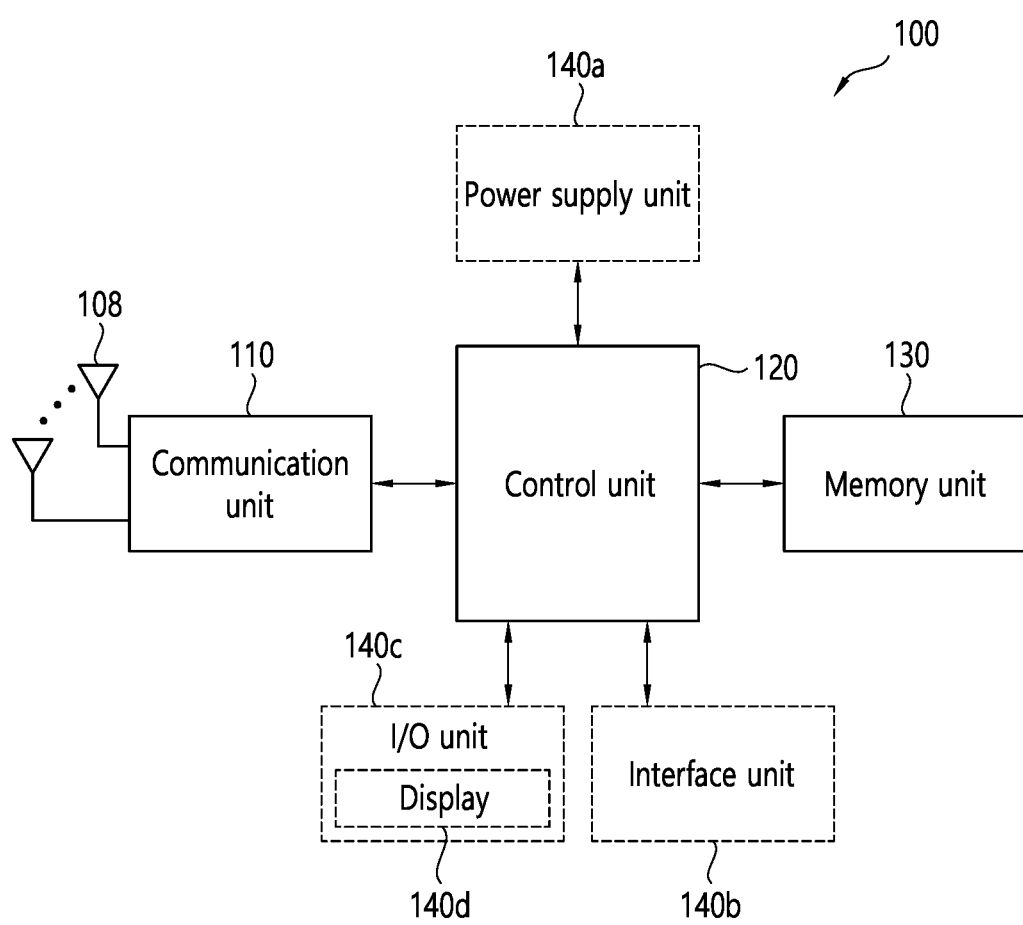
FIG. 32 shows a hand-held device, based on an embodiment of the present disclosure.

FIG. 32 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 32, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 31, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 33:
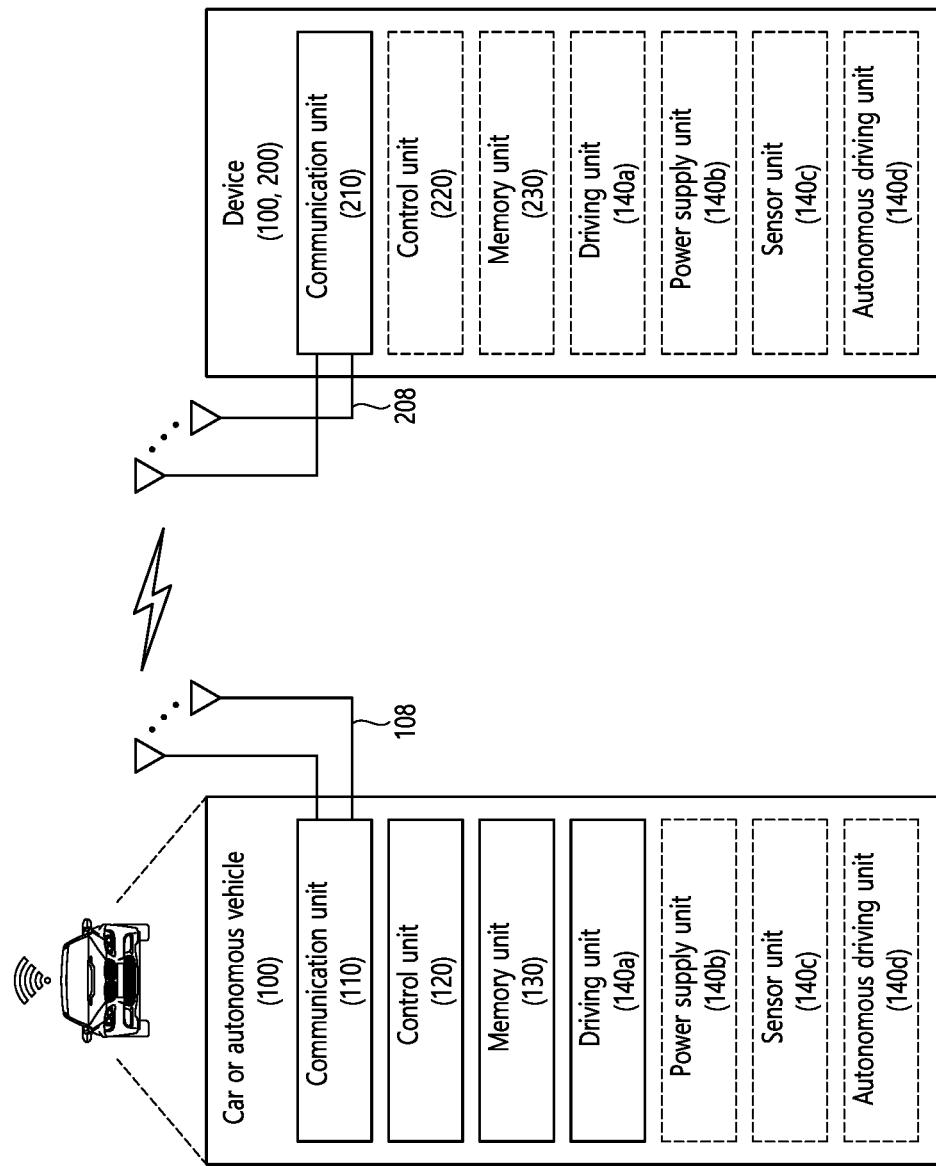
FIG. 33 shows a vehicle or an autonomous vehicle, based on an embodiment of the present disclosure.

FIG. 33 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 33, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 31, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    receiving, from a base station, information related to a physical uplink control channel (PUCCH) resource for reporting hybrid automatic repeat request (HARQ) feedback information and information related to a first sidelink (SL) resource;
    generating the HARQ feedback information based on first SL transmission being not performed on the first SL resource by the first device; and
    determining a priority value of the HARQ feedback information,
    wherein the priority value of the HARQ feedback information is a same as a largest priority value among at least one priority value related to the first SL resource.

2. The method of claim 1, further comprising:
    determining not to perform the first SL transmission on the first SL resource.

3. The method of claim 1, wherein the HARQ feedback information generated by the first device, based on the first SL transmission being not performed on the first SL resource by the first device, is acknowledgement (ACK).

4. The method of claim 3, wherein the first SL transmission includes physical sidelink control channel (PSCCH) transmission or physical sidelink shared channel (PSSCH) transmission.

5. The method of claim 4, wherein the first SL resource is a resource allocated by a configured grant.

6. The method of claim 5, wherein the first SL resource is allocated periodically by the configured grant, and
    wherein, based on the first device not performing the first SL transmission on the first SL resource within a first period allocated by the configured grant, the ACK is generated by the first device.

7. The method of claim 1, further comprising:
    performing at least one of second SL transmission based on a second SL resource or PUCCH transmission including the HARQ feedback information based on the PUCCH resource, based on the priority value of the HARQ feedback information and a priority value of the second SL transmission,
    wherein the PUCCH resource and the second SL resource overlap in a time domain.

8. The method of claim 7, wherein, based on the priority value of the HARQ feedback information being smaller than the priority value of the second SL transmission, the PUCCH transmission including the HARQ feedback information is performed.

9. The method of claim 7, wherein, based on the priority value of the HARQ feedback information being larger than the priority value of the second SL transmission, the second SL transmission is performed.

10. The method of claim 7, wherein, based on (i) the priority value of the HARQ feedback information being smaller than the priority value of the second SL transmission and (ii) sum of power related to the PUCCH transmission and power related to the second SL transmission exceeding maximum transmit power of the first device, the power related to the second SL transmission is reduced such that the sum does not exceed the maximum transmit power.

11. The method of claim 7, wherein, based on (i) the priority value of the HARQ feedback information being larger than the priority value of the second SL transmission and (ii) sum of power related to the PUCCH transmission and power related to the second SL transmission exceeding maximum transmit power of the first device, the power related to the PUCCH transmission is reduced such that the sum does not exceed the maximum transmit power.

12. The method of claim 1, further comprising:
    performing physical random access channel (PRACH) transmission to the base station,
    wherein a priority related to the PRACH transmission is higher than a priority related to physical sidelink feedback channel (PSFCH) transmission or a priority related to sidelink-synchronization signal block (S-SSB) transmission.

13. The method of claim 1, wherein the at least one priority value related to the first SL resource is at least one possible priority value for a configured grant related to the first SL resource.

14. A first device configured to perform wireless communication, the first device comprising:
at least one transceiver;
at least one processor; and
at least one memory connected to the at least one processor and storing instructions that, based on being executed, cause the first device to perform operations comprising:
receiving, from a base station, information related to a physical uplink control channel (PUCCH) resource for reporting hybrid automatic repeat request (HARQ) feedback information and information related to a first sidelink (SL) resource;
generating the HARQ feedback information based on first SL transmission being not performed on the first SL resource by the first device; and
determining a priority value of the HARQ feedback information,
wherein the priority value of the HARQ feedback information is a same as a largest priority value among at least one priority value related to the first SL resource.

15. The first device of claim 14, wherein the operations further comprise determining not to perform the first SL transmission on the first SL resource.

16. The first device of claim 14, wherein the HARQ feedback information generated by the first device, based on the first SL transmission being not performed on the first SL resource by the first device, is acknowledgement (ACK).

17. The first device of claim 16, wherein the first SL transmission includes physical sidelink control channel (PSCCH) transmission or physical sidelink shared channel (PSSCH) transmission.

18. The first device of claim 17, wherein the first SL resource is a resource allocated by a configured grant.

19. The first device of claim 18, wherein the first SL resource is allocated periodically by the configured grant, and
wherein, based on the first device not performing the first SL transmission on the first SL resource within a first period allocated by the configured grant, the ACK is generated by the first device.

20. A processing device configured to control a first device, the processing device comprising:
at least one processor; and
at least one memory connected to the at least one processor and storing instructions that, based on being executed, cause the first device to perform operations comprising:
receiving, from a base station, information related to a physical uplink control channel (PUCCH) resource for reporting hybrid automatic repeat request (HARQ) feedback information and information related to a first sidelink (SL) resource;
generating the HARQ feedback information based on first SL transmission being not performed on the first SL resource by the first device; and
determining a priority value of the HARQ feedback information,
wherein the priority value of the HARQ feedback information is a same as a largest priority value among at least one priority value related to the first SL resource.

* * * * *